United States Patent
DiClemente et al.

(10) Patent No.: US 10,532,812 B2
(45) Date of Patent: Jan. 14, 2020

(54) MULTI-HULL SEAPLANE

(71) Applicants: Perry Gino DiClemente, West Bloomfield, MI (US); William Gary Horn, Lusby, MD (US); James Campbell Davis, Brighton, MI (US)

(72) Inventors: Perry Gino DiClemente, West Bloomfield, MI (US); William Gary Horn, Lusby, MD (US); James Campbell Davis, Brighton, MI (US)

(73) Assignee: WAVE AIRCRAFT, INC., West Bloomfield, MI (US)

( * ) Notice: Subject to any disclaimer, the term of this patent is extended or adjusted under 35 U.S.C. 154(b) by 0 days.

(21) Appl. No.: 14/273,480

(22) Filed: May 8, 2014

(65) Prior Publication Data
US 2015/0321757 A1 Nov. 12, 2015

(51) Int. Cl.
*B64C 35/00* (2006.01)

(52) U.S. Cl.
CPC ............ *B64C 35/001* (2013.01); *B64C 35/00* (2013.01)

(58) Field of Classification Search
CPC ..... B64C 35/00; B64C 35/001; B64C 35/002; B64C 35/003; B64C 35/008; B64C 37/00; B64F 2700/6261
USPC ....................................................... 244/106
See application file for complete search history.

(56) References Cited

U.S. PATENT DOCUMENTS

| | | | | |
|---|---|---|---|---|
| 1,160,525 A * | 11/1915 | Mustin | .................... | B64C 35/00 114/244 |
| 1,213,453 A * | 1/1917 | Bristol et al. | ........... | B64C 35/00 114/291 |
| 1,748,252 A * | 2/1930 | Sundstedt | ............... | B64C 35/00 123/41.7 |
| 2,073,864 A * | 3/1937 | Brush | .................... | B64C 35/00 114/280 |
| 2,196,946 A * | 4/1940 | Stone | ...................... | B64C 25/54 244/101 |
| 3,614,032 A * | 10/1971 | Purcell, Jr. | ............ | B64C 31/028 114/123 |
| D227,604 S * | 7/1973 | Vrooman | ...................... | D12/324 |
| 4,691,881 A * | 9/1987 | Gioia | ...................... | B64C 35/00 114/272 |
| 4,924,792 A * | 5/1990 | Sapp | ........................ | B63B 1/18 114/271 |
| 5,277,383 A * | 1/1994 | Tormakhov | ............. | B64C 35/00 244/105 |
| 6,290,174 B1* | 9/2001 | Gioia | .................... | B64C 35/002 244/105 |
| D618,591 S * | 6/2010 | Nagapetyan | ..................... | D12/3 |
| 8,177,162 B2* | 5/2012 | Karkow | ............... | B64C 35/001 244/105 |

(Continued)

*Primary Examiner* — Medhat Badawi
*Assistant Examiner* — Vicente Rodriguez
(74) *Attorney, Agent, or Firm* — Jelic Patent Services, LLC; Stanley E. Jelic

(57) ABSTRACT

A multi-hull seaplane configured to eliminate most porpoising modes (only the low angle planing remains) by separating the forward and aft hulls and staggering them transversely so as the water flow from the forward hulls does not strike the rear hulls at planing speeds thereby eliminating afterbody induced porpoising. The forward and aft hulls are offset laterally with possible vertical offset and longitudinally to maintain lateral and longitudinal stability over all speed regimes.

8 Claims, 29 Drawing Sheets

(56) References Cited

U.S. PATENT DOCUMENTS

2005/0126464 A1* 6/2005 Lang ................... B63B 1/18
                                                                       114/67 A
2008/0302908 A1* 12/2008 Filipek ................. B63B 39/061
                                                                       244/105

* cited by examiner

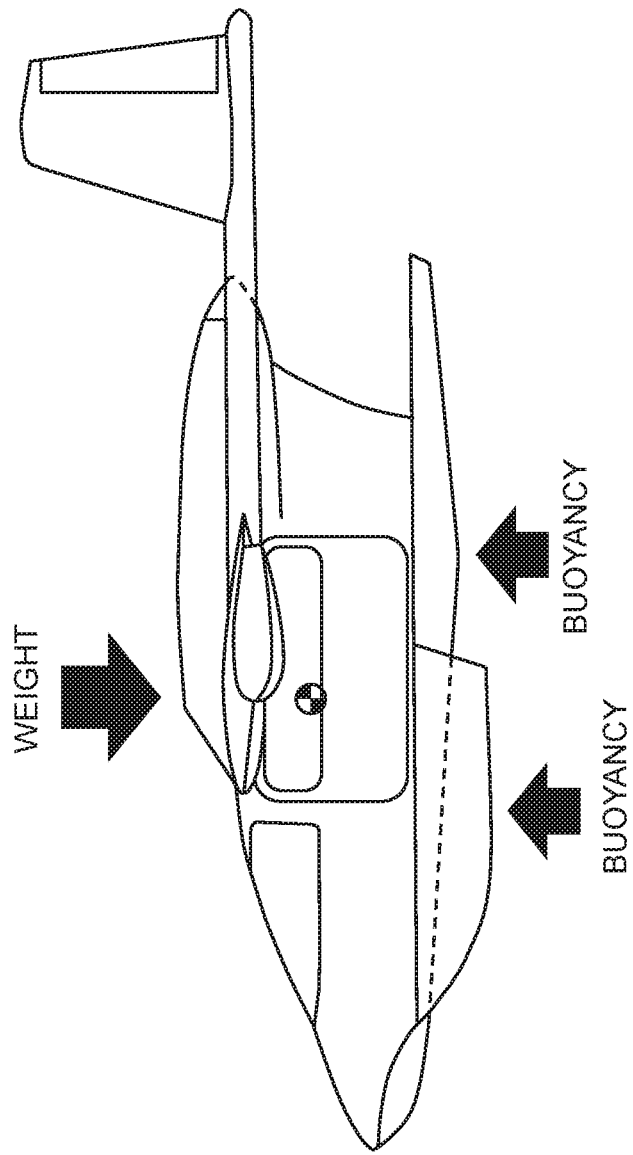

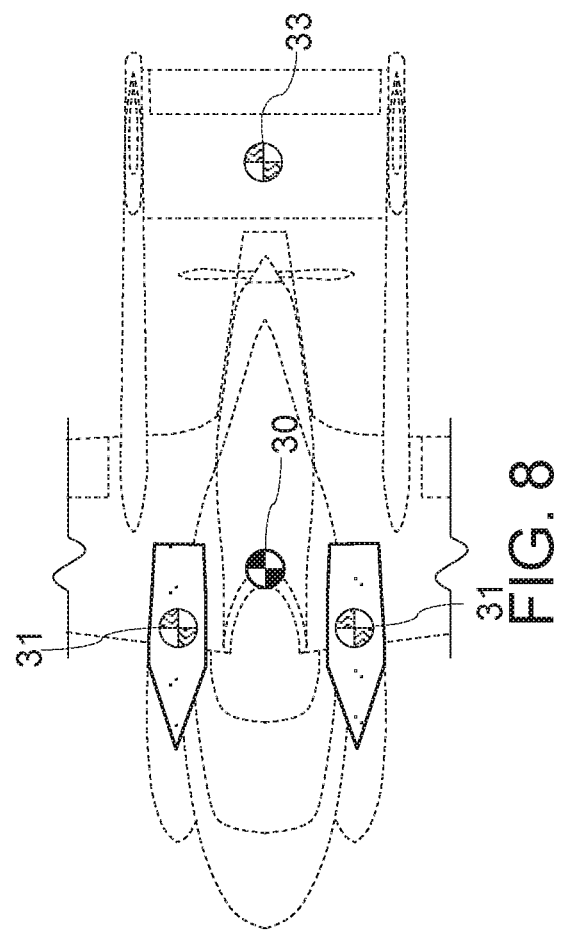

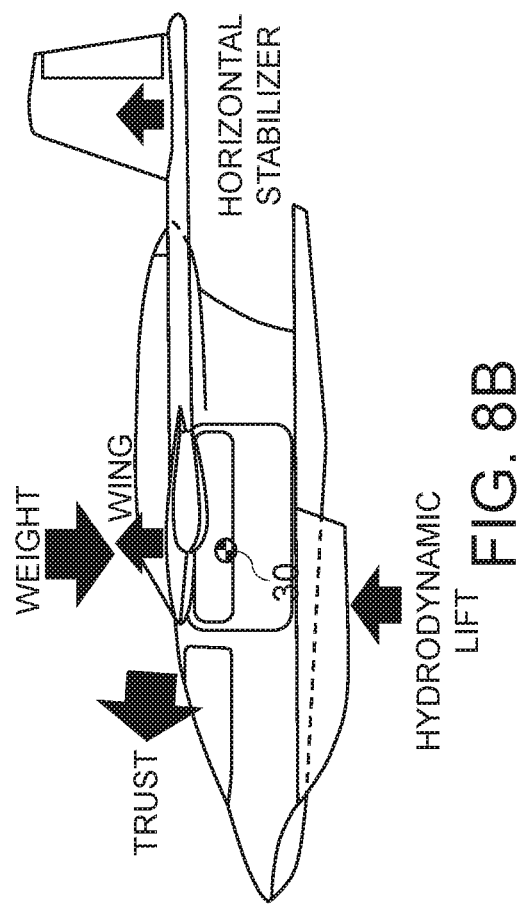

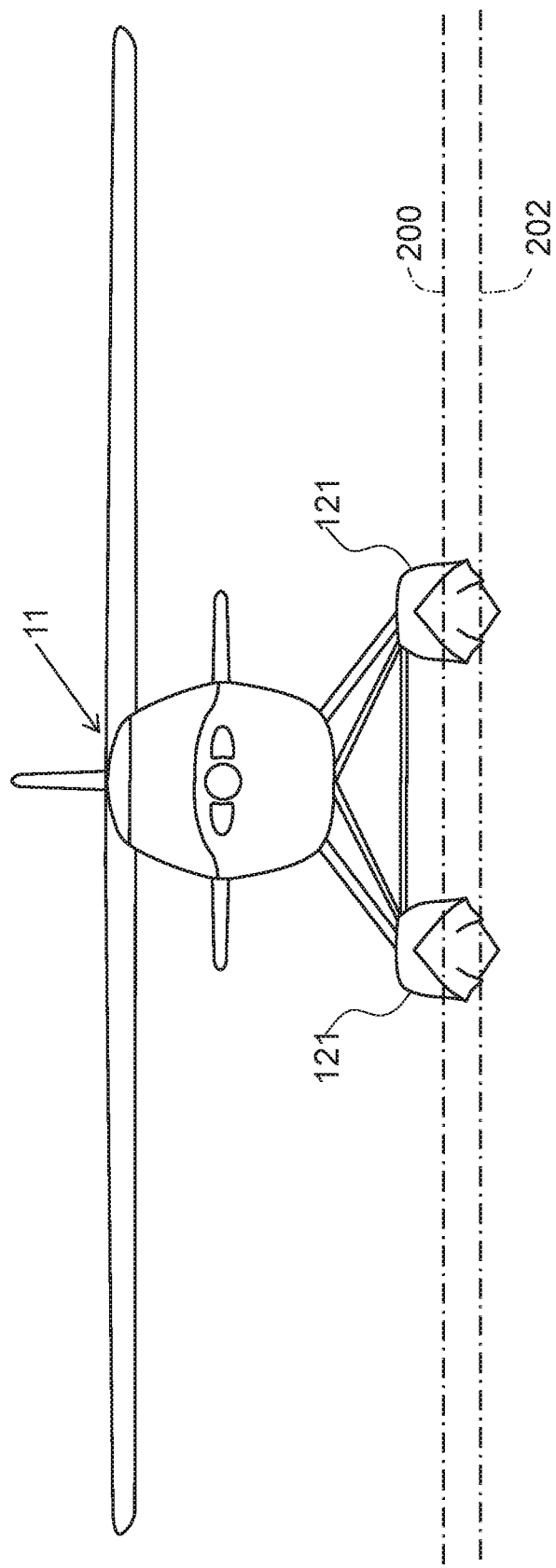

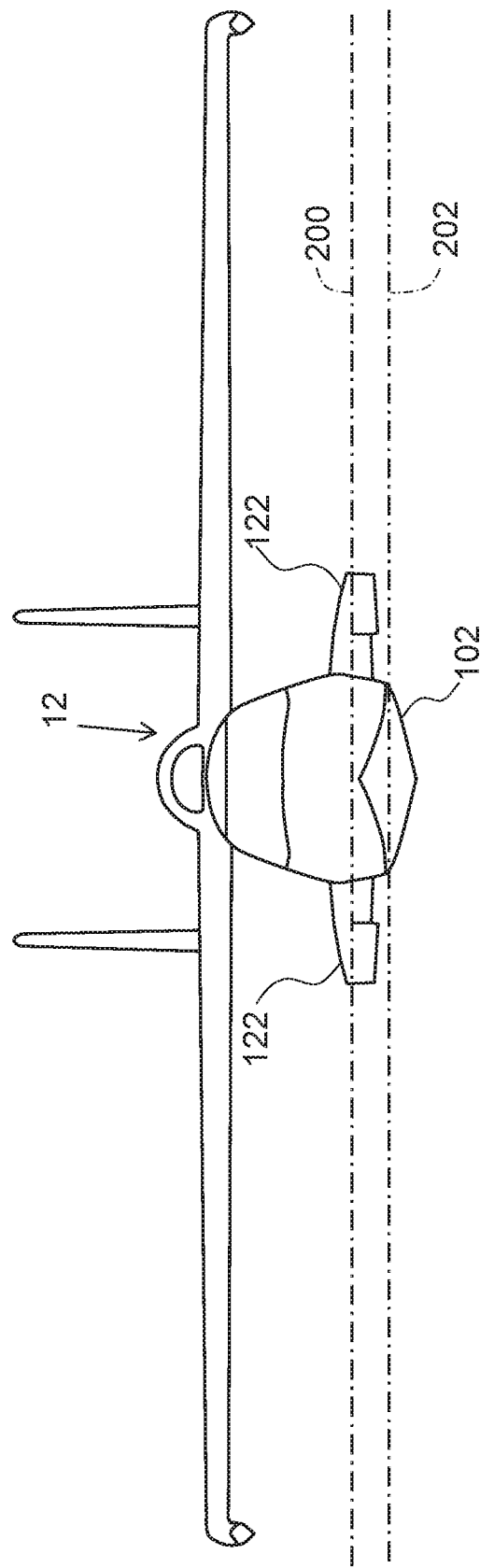

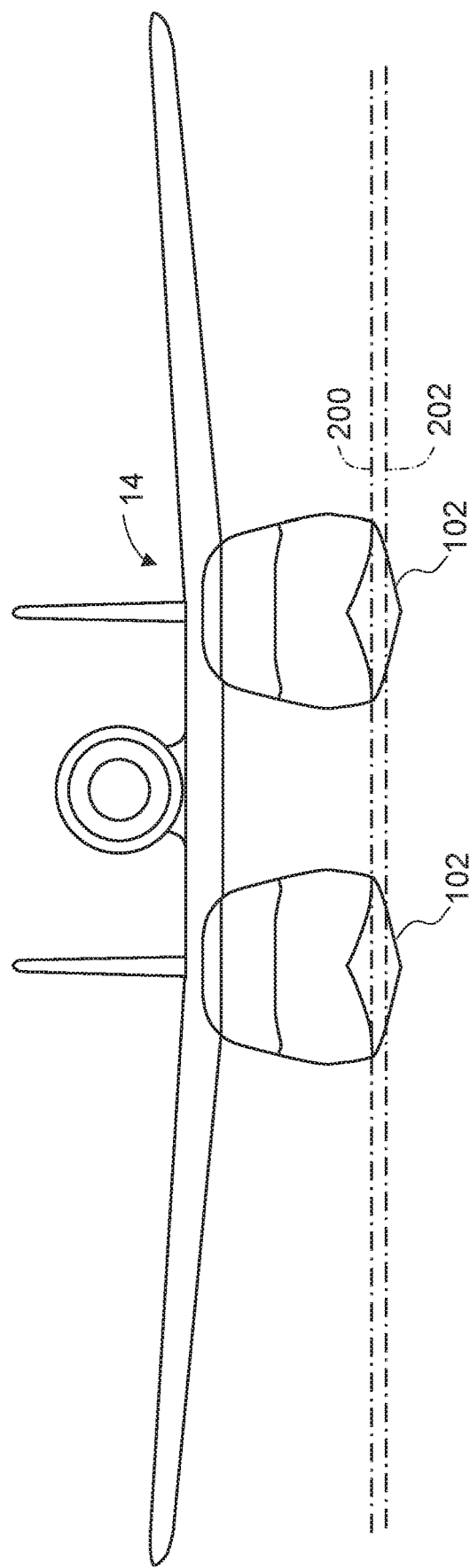

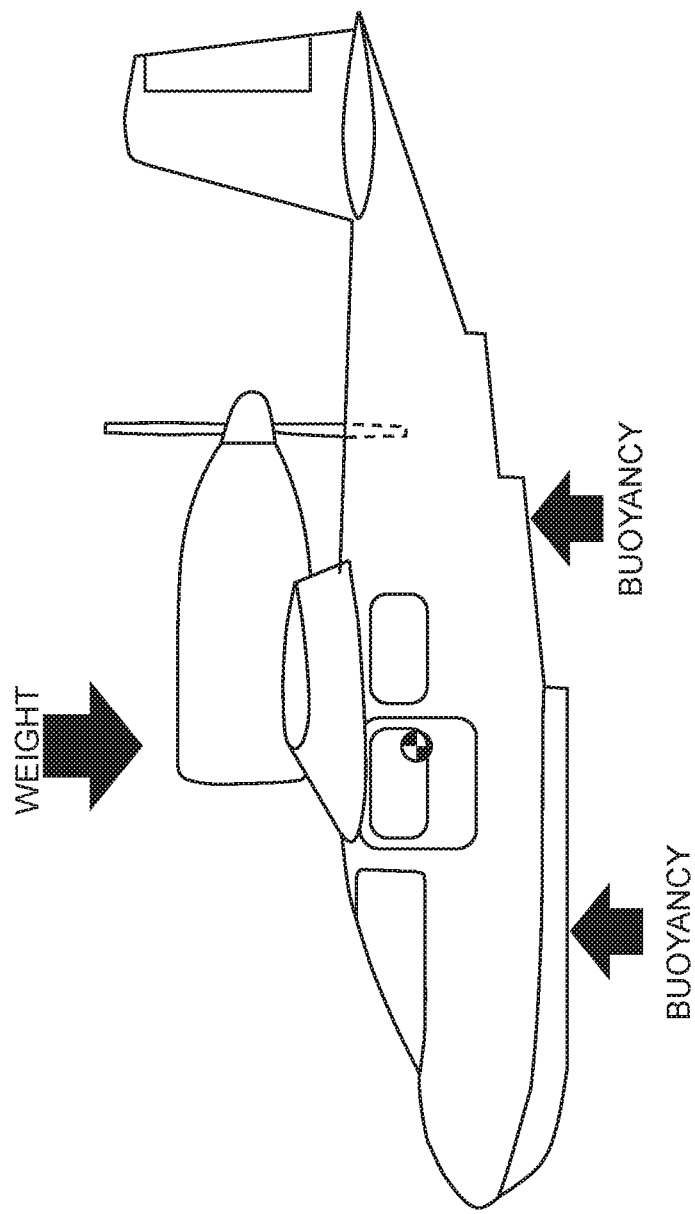

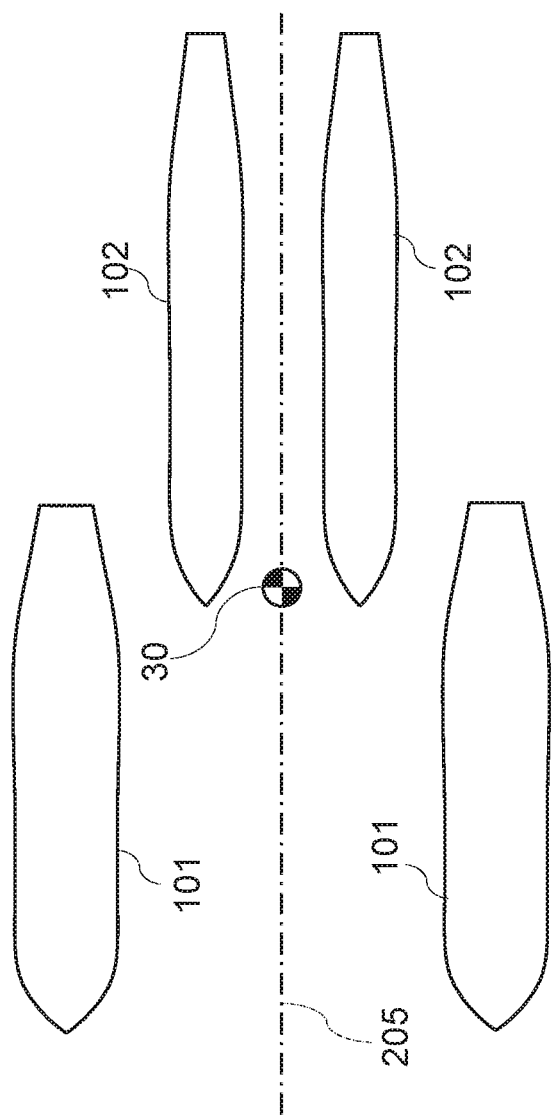

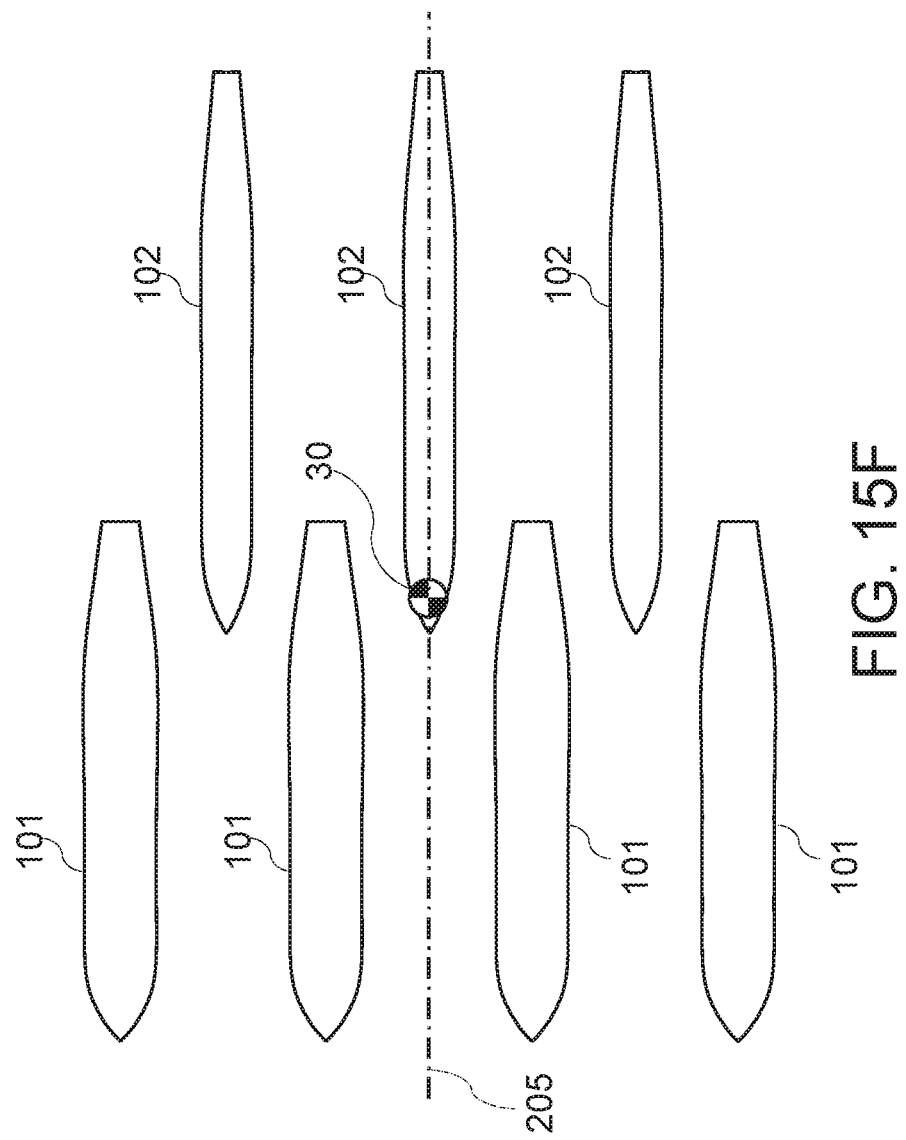

MULTI-HULL SEAPLANE

TECHNICAL FIELD

This disclosure is related to aviation. More particularly, the disclosure discusses flying boats; seaplanes, floatplanes, and/or amphibious variants having hulls or floats forward and aft that enhance performance both on the water and in the air.

BACKGROUND

The statements in this section merely provide background information related to the present disclosure. Accordingly, such statements are not intended to constitute an admission of prior art.

In the prior art, watercraft, such as seaplanes and their sub category flying boats and floatplanes, are known with a wide variety of hull configurations. A seaplane is a general category for aircraft that can operate on water. Flying boats (also sometimes confusingly called seaplanes) have a dedicated hull while floatplanes have external floats, sometimes detachable. To operate on water, these seaplanes require hulls that operate at low, intermediate, and high speed while providing static and hydrodynamic buoyancy and lateral and longitudinal stability while varying speed and attitude (pitch or trim) from rest to takeoff and from first water contact while landing to stationary.

The exact shape of the hull often differs from one waterborne aircraft to the next, from single to multiple.

Higher speed waterborne aircraft operate across a wide range of different speeds. Accordingly, it is possible that a hull design that operates acceptably at low speed may not operate acceptably at higher speeds.

Seaplanes compliment waterborne longitudinal stability with flight controls, i.e. elevator, with increased speed.

One type of longitudinal motion that may become pronounced at higher speeds is a phenomenon known as "porpoising," which means that the watercraft tends to rhythmically pitch and translate vertically while travelling forward. This term "Porpoising" is the common term for watercraft that refers to the motion of the watercraft that is like the movement of a porpoise jumping out of the water.

Porpoising is a dynamic instability of any seaplane or high speed watercraft operating and may occur when the seaplane is moving across the water while on the step at high speed. It occurs when the angle between the hull and the water surface exceeds the upper or lower limit of the vehicles's pitch stability limits. Improper use of trim, propulsion and/or speed, may result in attaining too high or too low a pitch (trim angle) sets off a cyclic oscillation which steadily increases in amplitude unless the proper trim angle or pitch attitude is reestablished.

In most cases, porpoising is more likely to occur when the watercraft is at a higher speed than when the watercraft is at a lower speed.

However, as the seaplane's speed increases, the hull generates greater lift (which is a function of speed) and the wing generates additional lift.

This means that, at higher speeds, less of the seaplanes' hull contacts the water as it rises out of the water.

Another item more concerning in seaplane operations is the Roach (or Rooster Tail). The Roach is a high energy fountain or high arching spray generated by water flowing off of the seaplanes step. The dynamic pressure is converted into motion causing the water to fly into the air. The roach typically impact the aft end of seaplane (hulls and floats) causing a destabilizing nose down force and is a major contributor to porpoising. It could also impact other aircraft components such as the wing, propeller and tail causing instability and drag. Placing a hull inline (aft hull after the step) or spaced too close laterally can have unwanted impacts from the Roach upon the seaplane.

Seaplanes are generally divided into two categories, dedicated Flying boats or Floatplanes. Seaplanes originated without landing gear and only were able to operate on the water. Today, the term Seaplane, includes to amphibious aircraft. An amphibious aircraft is one that can operate on both land and water. Both Flying boats and Floatplanes are also known as amphibious aircraft.

Flying Boats typically have a single hull, a hydro-dynamically designed lower fuselage (hull). For longitudinal stability at stationary and low speeds, sponsons, wing floats, and occasionally multiple hulls/floats are used.

Amphibious Flying Boats typically have landing gear retracting into the hull or sponsons as the design dictates allowing amphibious operation.

Float Planes are normally land planes converted to operate on the water by the addition of floats. There have been floatplanes that are only seaplanes.

An amphibious Float Plane may have landing gear either inside or external to the floats that can be extended for land operations.

Float Planes and Flying Boats usually have a step. This insures the hydrodynamic lift is produced very close to the center-of-gravity allowing the seaplane to rotate for takeoff. Rotation allows a higher angle-of-attack thereby increasing the wing's lift allowing for a controlled takeoff.

The area aft of the step is referred to as the "afterbody", that part of a seaplane hull or float aft of the main step and terminating at the sternpost, the aft end of the afterbody.

Incorporating the step with an afterbody or aft hull section inline, and not laterally spaced, can cause flow off of the step from striking the afterbody. This can result in longitudinal instability; Porpoising. All in-line or closely spaced lateral aft bodies reduce the trim angles of porpoise free operation.

An aft hull in line (after the step) with the front step(s), and hulls not laterally spaced from the step maybe impacted by the Roach, the flow off of the step. The roach striking the afterbody is the typical method of seaplane design reducing safe trim range of operation and resulting in the potential of Porpoising.

Conventional seaplane designs also tend to lack versatility in that while a particular design maybe suitable for use in specific environments, the same design may not be suitable for use in other environments. For example, a tri-hull boat configuration which may be quite efficient in smooth water conditions and at low speeds may not be suitable for rougher waters and at higher speeds.

Porpoising is induced from the interactions of the hulls used for longitudinal stability being inline or located too close laterally.

Single hull seaplanes, such as Flying Boats, utilize an inline stepped hull for longitudinal stability and sponsons or wing tip floats for lateral stability. Multi-hull seaplanes and most Float Planes use twin floats for longitudinal stability and lateral stability.

For static and low speed stability about the center of gravity, a minimum of three buoyant forces, are required for stability. These are generated by floats, hulls and/or sponsons. These maybe located either two forward, spaced apart for lateral stability and one aft balancing the forward buoyant forces for longitudinal stability. Conversely, the same can be accomplished with one buoyancy points forward and two buoyancy points aft. Additional floatation from additional hulls or floats may provide redundant stability.

A hull (or float) that includes a step and extends aft with a hull can be considered to have two buoyancy points for longitudinal stability in displacement mode; one forward and one aft of the center of gravity. Consequently, a twin hull float plane can be considered to have four buoyancy points; two laterally spaced in front of the cg and two laterally spaced behind the cg; in line with the front points.

A Flying boat with sponsons or wing tip floats is considered to have four points for stability. The main hull has a point forwards and aft, inline of the center of gravity with two points laterally spaced, from the sponsons or wingtip floats, for lateral stability. Additional hulls and or floats may be present providing additional stability forces.

Lateral stability at higher speeds is maintained by the hull, augmented by control surfaces as speed increases, allowing the seaplane to plane on the main hull, thereby having the wingtip floats or sponsons out of the water reducing hydrodynamic drag.

When Planing, the aft part of the hull, beyond the step are typically out of the water and not required for longitudinal stability since at higher speeds, the stability is provided by the hull plus elevator authority when available.

The aft hull used for static and low speed longitudinal is no longer required. Their location may be hazardous as they may impose porpoising from water or Roach impact. An alternate design eliminating this destabilizing Roach impact is possible.

Retractable gear is a design consideration and its incorporation into a boat hull or floats creates its own design challenges. Typically, the inline hulls, the area behind the steps are ustilized for the retractable landing gear.

Accordingly, there is a need for a multihull watercraft, configured with three or more hulls that is scalable, and which can provide a smooth, efficient ride over a range of speeds and water conditions to eliminate most porpoising modes for seaplanes and can also provide more efficient incorporation of the landing gear.

BRIEF SUMMARY OF THE INVENTION

A multi-hull seaplane comprises: a body housing a payload, the payload comprising at least one fuselage, at least one wing, and control surfaces; a power plant(s) which is coupled to the fuselage(s) or wing(s); front hull(s) which are coupled to the body and configured to provide forward buoyancy; and an aft hull(s) which is coupled to the body, wherein the aft hull(s) is configured to provide aft buoyancy, further wherein the aft hull(s) is positioned further aft of the front hull(s), further wherein the combination of forward and aft hulls provides hydrostatic and/or hydrodynamic longitudinal stability, further wherein the front hulls extend from the front of the seaplane and end at or about the a seaplane's center-of-gravity.

The hulls, structurally attached to the body, are configured to provide longitudinal and lateral stability.

The front hulls extend from the front of the seaplane and end at or about the center-of-gravity (CG) location.

The aft hull extends from the aft end of the seaplane and ends forward, aft, or about the center-of-gravity (CG) location.

The power plant(s), which is coupled to the body, wings, or pylons, provides the thrust to move the seaplane in the water or in the air.

The front hulls, which are coupled to the body, are configured to provide forward buoyancy.

The aft hull(s) which is coupled to the body is configured to provide aft longitudinal buoyancy. Furthermore, the aft hull(s) is positioned further aft of the front hull(s) and not in-line; what is typically known as the afterbody, that part of a seaplane hull or float aft of the main step.

The longitudinal stability is provided by either the front hulls or aft hulls whichever is located longitudinal from the center of gravity. The front hull(s) center of buoyancy being o of the aircraft's center of gravity and the aft hull center of buoyancy being behind the aircraft's center of gravity.

If there are two or more front hulls, they provide lateral stability. If there are two or more aft hulls, they provide lateral stability. There may be two or more front and two or more aft hulls. In this case, both front and aft hulls add to lateral stability.

The combination of forward and aft hulls provides hydrostatic and/or hydrodynamic lateral and longitudinal stability at rest and in low speed (non-planing) motion.

The multi-hull seaplane, wherein the aft hulls are displaced laterally with or without vertical separation from the wake from the forward hull avoids water impinging from the forward hull upon the aft hull during planing operations.

The multi-hull seaplane may take off from the water by initially starting at rest. Then the seaplane applies power and starts to taxi (forward movement). As the seaplane starts to accelerate, the trim angle (or nose of the seaplane) increases as the water piles up in front of the front hull. The hulls are wetted and with increased speed the seaplane starts to ride ("pre-plane") on the three hulls. The aft hull(s) laterally spaced from front hulls so no or little water impinges on the aft hull(s).

With increased speed, the seaplane starts to plane—this means that hydrodynamic lift is predominant. When the seaplane is "planing" all lift is generated from the front hull(s) and with the aft hull no longer wetted. The aircraft is positioned in the longitudinal attitude and speed increases to takeoff. As speed increases, the wing produces more aerodynamic lift and therefore less hydrodynamic is required decreasing hull drag.

The forward and/or aft hulls are displaced longitudinally, so that while in displacement mode (stationary and low speed operation) they provide longitudinal stability at all speeds, from rest to takeoff and/or landing speeds.

The front, aft, or both hull(s) are offset from the centerline and configured to provide lateral stability while floating at zero velocity (hydrostatic) through takeoff and landing speeds (hydrodynamic) conditions. The only exception is at high planing speeds, the wing may generate sufficient forces to roll the seaplane so only one outboard float or hull is in contact with the water.

The front hull(s) are positioned forward of a seaplane's or boat CG.

The aft hull(s) are positioned aft of a seaplane's or boat CG.

A method of utilizing the multi-hull seaplane comprises transitioning through a water displacement phase prior to exceeding a Froude number; transitioning through water planing phase; and transitioning to becoming airborne.

A method of utilizing the multi-hull seaplane comprises decelerating to a landing speed; contacting a liquid surface with the hull; contacting the liquid surface with the front hulls; decelerating to a stop on the liquid surface.

In a separate embodiment, the body and/or hulls further comprises retractable landing gear which is configured to enable the seaplane to operate on land.

The scope of the invention is defined by the claims, which are incorporated into this section by reference. A more complete understanding of embodiments on the present disclosure will be afforded to those skilled in the art, as well as the realization of additional advantages thereof, by consideration of the following detailed description of one or more embodiments. Reference will be made to the appended sheets of drawings that will first be described.

BRIEF DESCRIPTION OF THE DRAWINGS

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. Accordingly:

FIG. 5A is a side view of a multi-hull seaplane embodiment illustrating the weight of the seaplane is counteracted by the forward and aft hulls providing longitudinal and lateral stability in the DISPLACEMENT mode;

FIG. 8 is a cross-section view, taken at or slightly below the water-line of a multi-hull seaplane embodiment illustrating the water contact area of the forward hulls while PLANING;

FIG. 8B is a side view of a multi-hull seaplane embodiment illustrating the dynamics of the forces in the PLANING mode;

FIG. 10 is a seaplane (FLOAT PLANE) that consists of an aircraft with cantilevered floats attached;

FIG. 11 is a seaplane with a center hull with hull mounted sponsons;

FIG. 13 is a twin hulled seaplane;

FIG. 13A is a twin hulled seaplane illustrating the weight of the seaplane is counteracted by the forward and aft hulls providing longitudinal and lateral stability in the DISPLACEMENT mode;

FIG. 15C is a four hull multi-hull arrangement with two aft hulls located inboard of the two forward hulls;

FIG. 15F is a seven hull multi-hull arrangement with more hulls located forward than aft;

DETAILED DESCRIPTION

Figure 1:
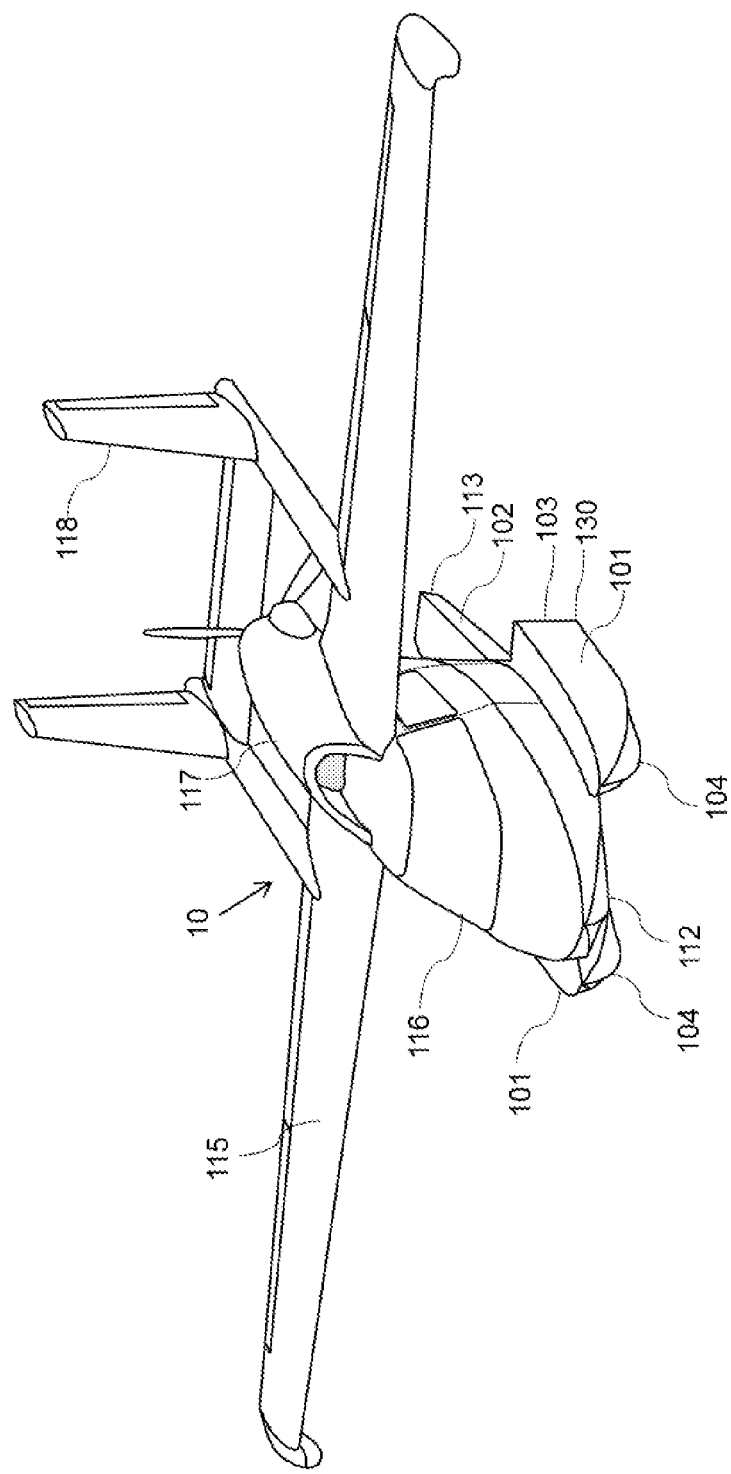
FIG. 1 is a perspective view of an amphibious aircraft having lateral and longitudinal stability systems according to one embodiment of the present invention.

The following detailed description of the invention is merely exemplary in nature and is not intended to limit the invention or the application and uses of the invention. Furthermore, there is no intention to be bound by any theory presented in the preceding background of the invention or the following detailed description of the invention.

Porpoising instability has been divided into three basic types, (a) forebody, (b) forebody-afterbody, (c) step instability.

The first type of porpoising instability occurs during planing on the forebody only when the attitude decreases below a critical value. It is associated with a positive water pressure distribution over the forebody near the step; there is no flow on the afterbody. The instability corresponds theoretically to that of a single planing surface.

The second type of porpoising instability occurs during planing on the front and rear steps whenever the attitude exceeds a critical value. It is associated with a positive water pressure distribution over the forebody and afterbody in the region of the steps only. There is no flow on the first 70 to 80 percent of the afterbody. This porpoising corresponds to the theoretical case of two planing surfaces in tandem.

The third type of porpoising instability occurs when the water flow is not separated efficiently from the hull bottom at the main step. Large negative pressures alternate with positive pressures on the whole afterbody, the combination causing violent instability, from: ARC/R&M-2852, "A Review of Porpoising Instability of Seaplanes," February, 1944, A. G. Smith, and H. G. White, which is herein incorporated by reference in its entirety.

The embodiments cited in the present disclosure eliminate type (b) forebody-afterbody and (c) step instability by prohibiting the water flow off of the step from striking the afterbody. These two types are collectively known as LOW SPEED INSTABILITY while type (a) forebody is known as high speed instability since it typically occurs at high speed and low trim angles. This type of instability is present for all planing craft, boats, seaplanes, etc. but aircraft can easily overcome this instability with aerodynamic control power.

A watercraft operating on the water needs to maintain longitudinal and lateral stability while varying speed and attitude. For seaplanes, the Federal Aviation Administration (FAA) defines four speeds of operation: (1) DISPLACEMENT or idling (2) PLOWING, (3) PLANING and (4) TAKEOFF.

Idling or DISPLACEMENT—the buoyancy of the items supporting buoyancy, such as floats, sponsons, hull, etc. supports the entire weight of the seaplane and it remains in an attitude similar to being at rest on the water. The static and low speed lateral and longitudinal stability is obtained by the hull and floats creating buoyant lift around the center of gravity (CG).

PLOWING—at low speeds up to planing, the forward motion creates a bow wave causing the seaplane to pitch up and climb the wave. This climbing the bow wave lasts through hump speed—the hump refers to the greatest drag that occurs just prior to planing, i.e. climbing the bow wave and corresponds to a Froude number=1. This resistance typically reaches its peak just before the floats are placed into a planing attitude.

In the PLANING position, most of the seaplane's weight is supported by hydrodynamic lift rather than the buoyancy of the floats. Dynamic instability is present and this phase lasts until takeoff. Operations in this phase for taxiing are common as the drag is lower than hump and the higher speed expedites covering distance over the water.

TAKEOFF, sufficient speed is obtained for the wing lift to fly the seaplane off the water.

For a single hull boats, twin hulls or planes with floats, these hulls have steps located near or just aft of the center of gravity allowing for rotation on takeoff and landing. Rotation allows increasing the wing's angle of attack, thereby increasing lift allowing takeoff or reducing landing speed and also reducing water impact loads.

All watercraft develop a suction force as the finite length of the hull or floats creates a depression in the water creating a Venturi effect. At forward speeds, this Venturi creates a suction force that is most evident in very calm water. Seaplanes typically have extended takeoff distances in very calm water and refer to having to "break the suction" to takeoff. For an aircraft, this suction needs to be overcome so that the aircraft can depart from the water safely.

The step in the hull or float positioned at or just aft of the CG provides a water separation point and allows the aircraft to rotate about the CG for takeoff and landing. This distinctive 'step' enables the hull and floats to cleanly break free of the water's surface at take-off This step is a performance reducer, since it creates aerodynamic drag. It also causes destabilizing forces in typical flying boat and floatplane designs since the water flow off the step can impinge on the after hull causing variable pitching moments, the classic porpoising.

A multi-hull system of the present disclosure provides the lateral stability with either forward or aft hulls/floats laterally separated from the centerline. Longitudinal stability for floating and low speeds is provided by having forward and aft hulls spaced from the center of gravity.

The multi-hull system provides longitudinal stability from static waterline trim through maximum displacement speed (as constrained by the Froude number). As the multi-hull system approaches the Froude number speed of 1, the forebody begins to lift the airframe to progressively lower dynamic waterlines (i.e. more of the airframe is higher above the water surface).

This multi-hull system allows for an attitude at rest and another attitude in motion.

To operate on water a seaplane must displace a weight in water equal to its weight in stationary and low speed operation, i.e. it must float. Movement in the water creates lift. A properly shaped hull uses the dynamic pressure of the water to create lift that increases with speed. At zero and low speeds, most lift is hydrostatic (buoyancy). As speed increases, hydrostatic and hydrodynamic forces blend to create lift. At planing speeds most of the lift is hydrodynamic. A seaplane's wings create aerodynamic lift that increases with speed. At takeoff, the aerodynamic lift equals the weight and the seaplane can fly.

A planing hull uses hydrodynamic lift to rise up and out of the water to reduce resistance. In order to plane, the hull must achieve an appropriate angle of incidence to the water flow, trimming up by the bow to generate lift.

This is a similar lift principle that an aircraft use to get aloft. As the generated lift approaches the weight of the boat, the hull rises from the water and starts to plane.

The speed-power curve (FIG. 4) shows how much resistance a boat generates as speed increase. As the boat's speed increases in displacement mode, the bow trims up and the stern squats. At a speed roughly equal to 1.5 times a square root function of the waterline length, if the hull is designed to plane, it will move into a transitional region where it is neither planing nor operating in the displacement condition. In this semi planing or hump region, the boat will have pronounced bow-up trim. When it breaks through the hump to a true plane (thanks to hydrodynamic forces), its speed increases and trim levels out. This occurs at roughly 2.5 times a square root function of the waterline length.

Hull drag is a function of wetted surface. Hull drag can be reduced by lifting more of the hull out of the water (thereby reducing wetted surface).

A system for enhanced stability of an amphibious aircraft is hereafter disclosed; it includes a buoyancy system laterally and longitudinally displaced to provide for static and dynamic stability while avoiding two unstable porpoising modes.

Different approaches are used in the design of a hull of an amphibian (water and land) aircraft or seaplane (water only) along with boats. These include Twin Floats, flat hulls, shallow V hulls, multi shaped hulls (M shapes, scalloped, etc.), Single Deep-V hulls, Twin-Hulls, tri-hulls, multi-hulls all with or without sponsons for lateral stability.

An integral floatation device, typically the hull with added sponsons or wing mounted floats, adds volume and area that impedes aircraft performance typically reducing speed. A typical design feature of a hull, sponsons and wing mounted floats are aft facing steps; this additionally impedes performance by the additional drag it creates during flight.

In some embodiments, the outer hulls provide lateral stability and longitudinal stability with or without conjunction with the hull.

Planing verses displacement: There are various trade-offs to consider. Movement in the water by displacement may impede some takeoff ability, adding a step for better water performance allowing rotation, so the vehicle can "plane" will impede performance in the air. Restated, while displacement may impede some takeoff ability, adding a step for better water performance will impede performance in the air. The aircraft should also be shaped to minimize the drag in the air as well as in the water.

The present disclosure fulfills a need to provide a seaplane or amphibious aircraft design that provides a multi-hull approach that enables efficient separation of the aircraft from the water without impeding performance by adding a device such as cantilevered floats or an afterbody after a step.

Cantilevered floats provide latitude control at lower speeds. These floats also provide longitudinal stability due to their length. This keeps the aircraft out of the water but results in high aerodynamic drag out of the water.

FIG. 1 is a perspective view of an amphibious aircraft having lateral and longitudinal stability systems according to one embodiment of the present invention. Depicted is an aircraft 10, comprising of a fuselage that houses a cabin area 116, wing 115, control surfaces such as a tail 118 and a power plant 117.

Depicted are the front hulls, with no afterbody, which are coupled to the body(s) configured to provide forward buoyancy; forward hulls 101, forward hull leading edges 104, forward hull trailing edges 103, and step 130.

Depicted is the aft center hull 102, with no afterbody, which is coupled to the body, wherein the aft hull is configured to provide aft buoyancy, further wherein the hull is positioned further aft of the front hulls, along with the center hull leading edge 112 and hull trailing edge or sternpost 113.

Figure 2:
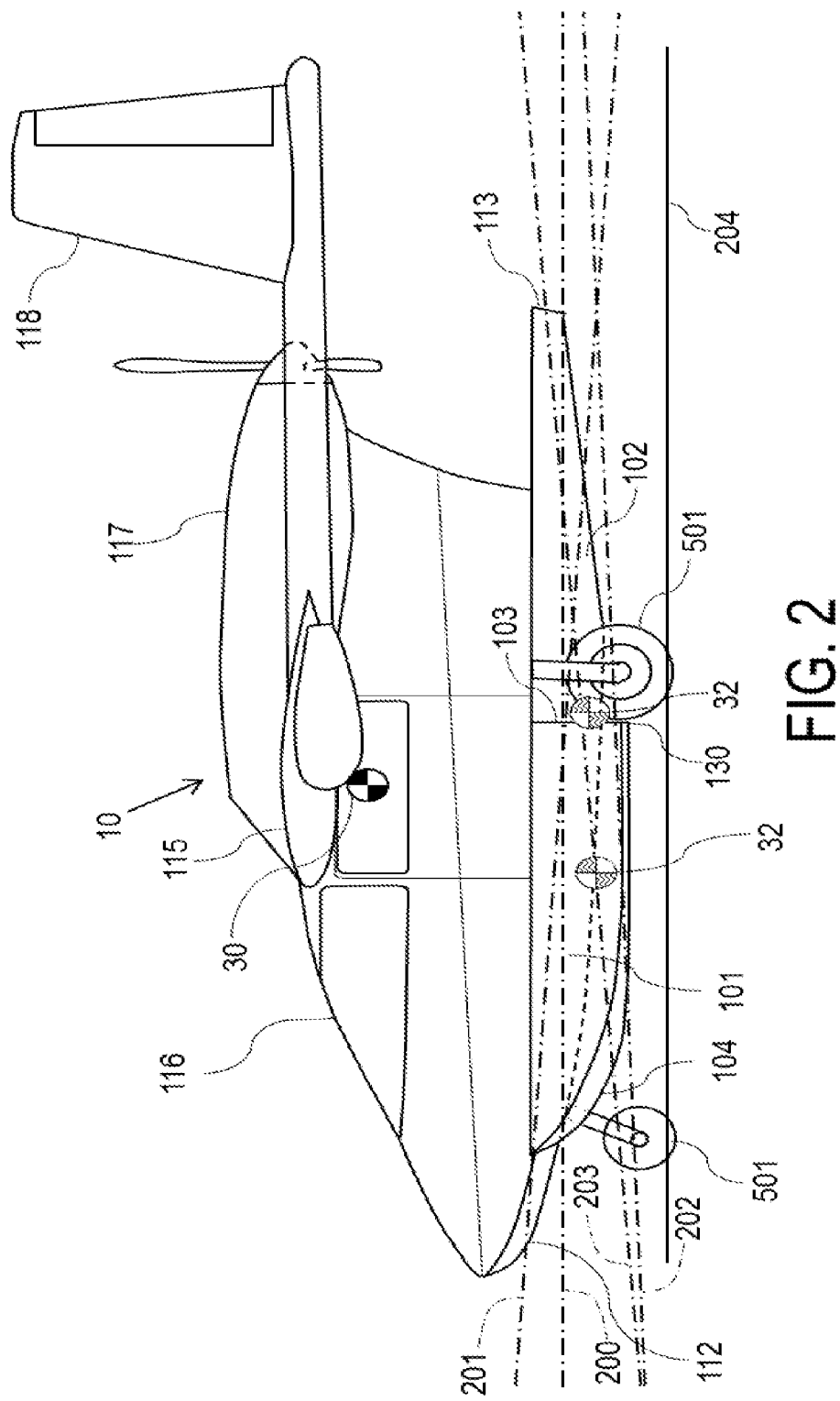
FIG. 2 is a side view of an amphibious aircraft embodiment illustrating the outboard hulls which are forward of the center hull and center of gravity. Also depicted are the waterlines for a stationary (slow moving) hull and a waterline for a dynamic hull; when in motion (aft longitudinal force increased)

FIG. 2 is a side view of an amphibious aircraft embodiment illustrating the outboard hulls which are forward of the center hull and center of gravity 30.

Depicted is an aircraft 10, a left hull 101, left hull leading edge 104, left hull trailing edge 103, main step 130, center hull 102, center hull leading edge 112, center hull trailing edge or sternpost 113, wing 115, cabin area 116, power plant 117, tail 118, and body 301. The front hulls extend from the front of the seaplane and end at or just aft of the CG location.

Depicted are the waterlines for the hull at the four speeds of operation and the ground line when the aircraft is on land. The DISPLACEMENT waterline 200 depicts the waterline when at rest. The PLOWING waterline 203 depicts the waterline at low speeds up to planing. The PLANING waterline 202 depicts the waterline when of the seaplane's weight is supported by hydrodynamic lift. Waterline 201 represents a nose down moment showing how the added buoyancy from the center hull, typically above waterline can keep the seaplane from nosing over. This can be caused by trying to slow down abruptly, impacting a large wave or a nose down landing attitude. The ground line 204 depicts the ground line when landing gear 501 is extended.

Figure 3:
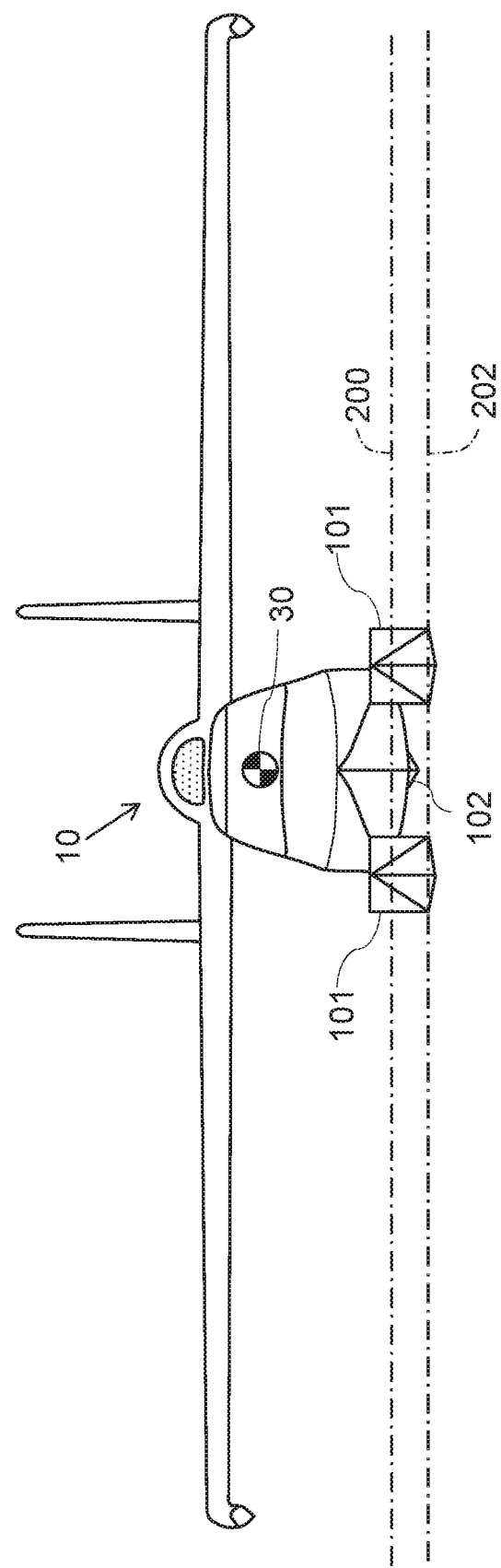
FIG. 3 is a front view of an amphibious aircraft embodiment illustrating the outboard hulls. Also depicted are the hulls which are part of the same structure, not cantilevered, with no afterbody

FIG. 3 is a front view of an amphibious aircraft 10 embodiment illustrating the symmetric outboard hulls, wherein the forward hulls 101 are displaced laterally, offset from the centerline from the center of gravity 30, to provide lateral stability of the watercraft floating at zero velocity (hydrostatic); known as the DISPLACEMENT mode showing the displacement mode waterline 200 through forward movement at higher speeds (hydrodynamic) conditions such as the PLANING mode, indicating the planing mode waterline 202. The leading edge of the center hull 102 may extend further forward than the leading edges of the forward main hulls 101 wherein the center hull center of buoyancy 32 is aft of the watercrafts center of gravity 30.

The DISPLACEMENT waterline 200 depicts the waterline when at rest. The hull can be above or below this line dependent on design parameters laterally and longitudinally and the weight required for displacement.

The PLANING waterline 202 depicts the waterline when PLANING, also depicting the center hull 102 above the waterline.

Figure 4:
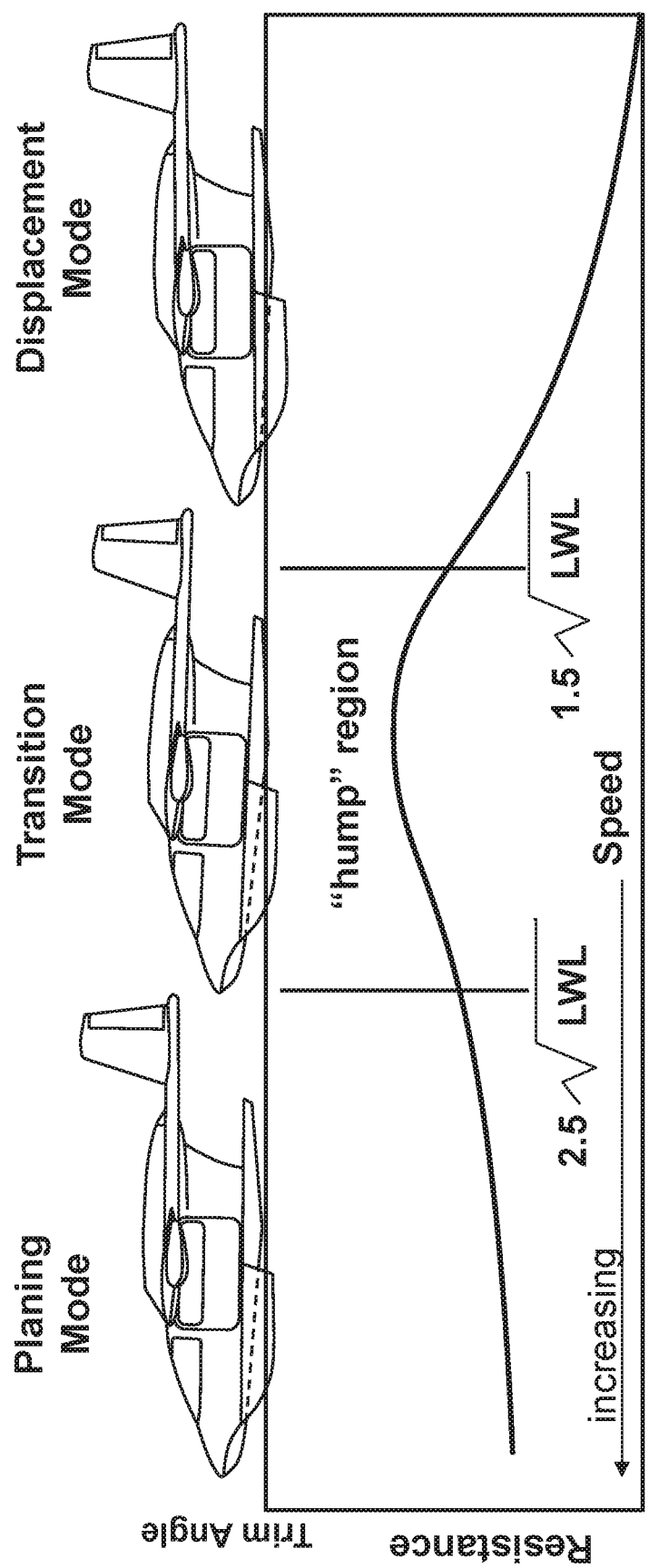
FIG. 4 is diagram of the multi-hull watercraft embodiment illustrating the watercrafts operating modes, the speed ranges and trim angles for each operating mode showing how much resistance the multi-hull watercraft generates as speed increases through the speed regime from the Displacement Mode, through the Transition Mode, passed the "hump" region though the Planing Mode.

FIG. 4 shows the speed-power curve showing how much resistance the multi-hull seaplane generates as speed increases. As the multi-hull seaplane speed increases, in displacement mode, the bow trims up and the stern squats. At a speed roughly equal to 1.5 times a square root function of the waterline length, it will move into a transitional region where it is neither planing nor operating in the displacement condition. In this "semi-planing" or "hump region", the watercraft will have pronounced bow-up trim. When it breaks through the hump to a true plane (thanks to hydrodynamic forces), its speed increases and trim levels out. This occurs at a speed roughly equal to roughly 2.5 times a square root function of the waterline length.

Common nomenclature defines three speeds (MODES) of operation: (1) DISPLACEMENT, at rest or idling (2) TRANSITION, plowing, semi-displacement or pre-planing and (3) PLANING.

At rest, the multi-hull seaplane is supported by buoyancy. The static water pressure surrounding the hull holds it in place, supporting the entire weight of the craft. This hydrostatic state is completely a function of the hull's volumetric shape.

In this DISPLACEMENT MODE (at rest, idling), the multi-hull seaplane remains in an attitude similar to being at rest on the water. The static and low speed lateral and longitudinal stability is achieved by the hull creating buoyant lift around the center of gravity.

When a multi-hull seaplane begins to move, it forces water around and under the hull(s) and it is no longer in a hydrostatic state. It is now in hydrodynamic motion. As the multi-hull seaplane moves at low speeds, the water typically follows flow lines that return more-or-less to their original position behind the hull. This is traditionally called the displacement hull mode.

For planing hull types, the DISPLACEMENT MODE is up to a speed of $1.5 \times \sqrt{LWL}$ where LWL=Waterline Length (defined as the length of the watercrafts hull, from center fore to center aft at the level of the water.)

Figure 5:
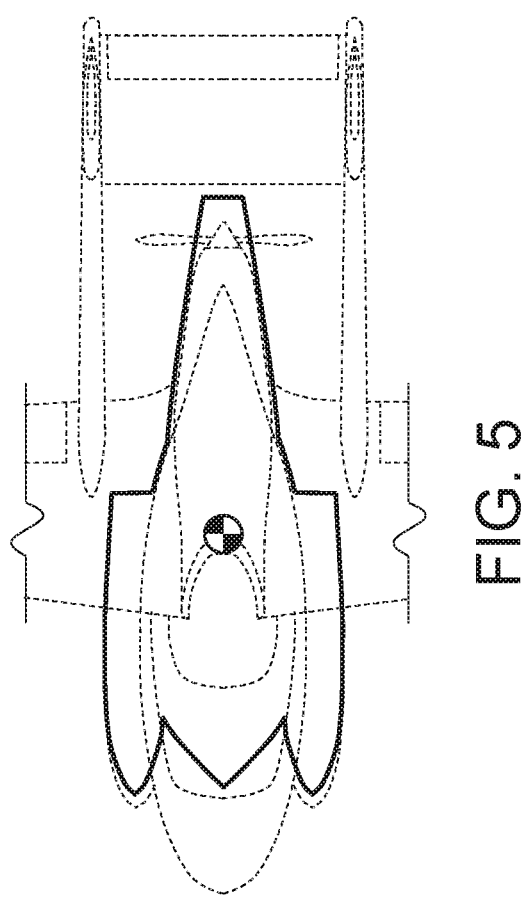
FIG. 5 is a cross-section of a multi-hull seaplane embodiment illustrating outboard hulls which are forward of the hull. The cross section is shown at a DISPLACEMENT water line for a stationary hull.

FIG. 5 is a top view cross-section of a multi-hull seaplane embodiment illustrating outboard hulls which are forward of the center hull. The cross section is shown at a DISPLACEMENT water line 200 depicted in a side view in FIG. 2. DISPLACEMENT is when the buoyancy of the floats supports the entire weight of the seaplane and it remains in an attitude similar to being at rest on the water.

Depicted are the forward hulls, and the center hull which are part of the same structure; not cantilevered.

FIG. 5A is a side view of a multi-hull seaplane embodiment illustrating the weight of the seaplane is counteracted by the buoyancy of the forward and aft hulls providing longitudinal and lateral stability in the DISPLACEMENT mode. FIG. 5A shows that each aft supporting surface is at a lesser depth than each forward supporting surface.

Figure 6:
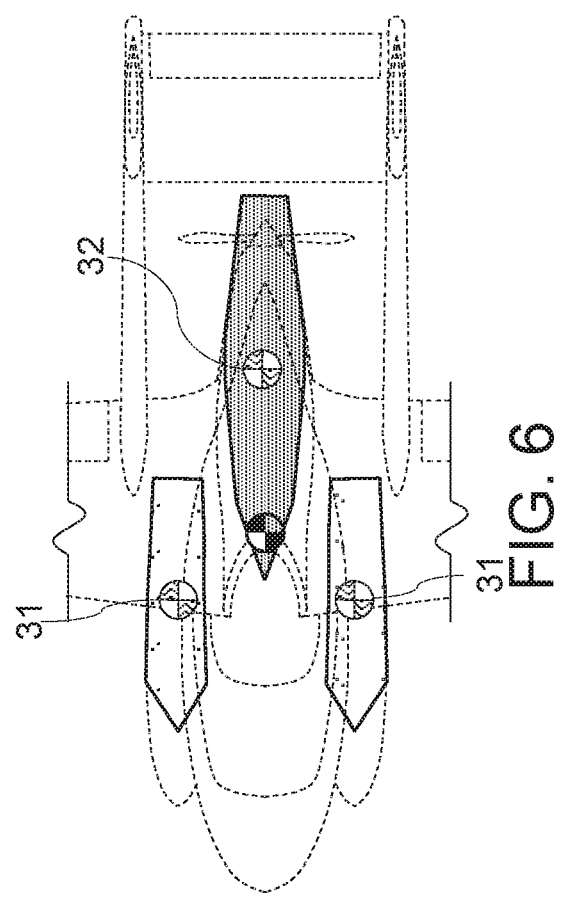
FIG. 6 is a cross-section view, taken at or slightly below the water-line of a multi-hull seaplane embodiment illustrating the dynamics hull while PLOWING.

FIG. 6 is a top view cross-section of a multi-hull seaplane embodiment illustrating outboard hulls which are forward of the center hull. The cross section is shown at a PLOWING water line 202 depicted in a side view in FIG. 2. When PLOWING at low speeds up to planing, the forward motion creates a bow wave to form causing the seaplane to pitch up and climb the wave. The aft hull(s) maintain the seaplane's attitude until planing. Depicted are the centers of buoyancy 31, 32 to maintain longitudinal and lateral stability. FIG. 6 shows that no forward surface is in-line longitudinally with any aft surface.

Figure 7:
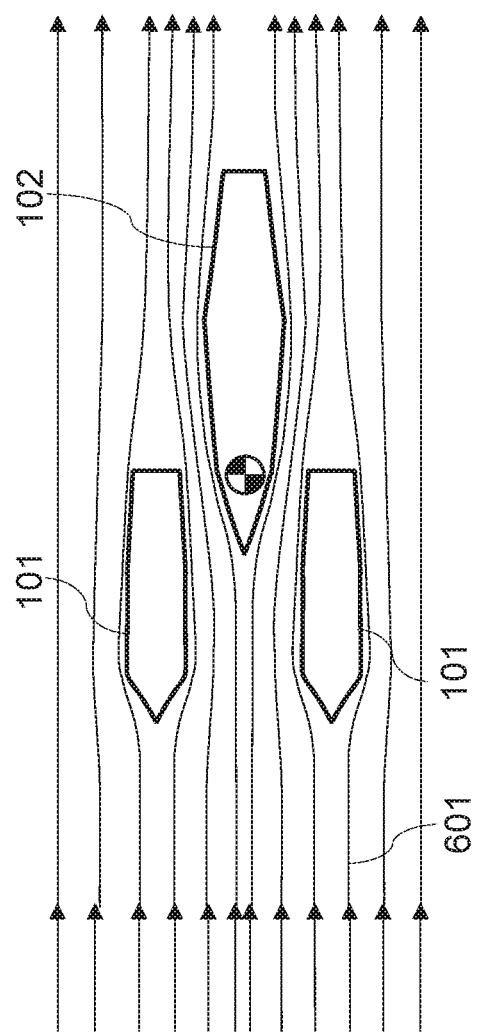
FIG. 7 is a cross-section view, taken at or slightly below the water-line of a multi-hull seaplane embodiment illustrating the dynamics hull while PLOWING.

FIG. 7 is a cross-section view, taken at or slightly below the water-line of a multi-hull seaplane embodiment illustrating wherein the aft hull 102 is displaced laterally with or without vertical separation from the wake from the forward hulls 101 avoids water impinging from the forward hull upon the aft hull during pre-planing operations. Any water flow 601 from the aft end behind the step does not impinge on the hull since there is no structure behind the step.

FIG. 8 is a top view cross-section of a multi-hull seaplane embodiment illustrating outboard hulls which are forward of the center hull. The cross section is shown at a PLANING water line. The PLANING waterline 202, depicted in a side view in FIG. 2, depicts the waterline when of the seaplane's weight, is supported by hydrodynamic lift. Depicted are the centers of buoyancy 31, 32 to maintain longitudinal and lateral stability. The forward, and lateral, buoyancy is from the forward hulls hydrodynamic lift. The longitudinal stability is maintained by the horizontal stabilizer force 33.

Figure 8A:
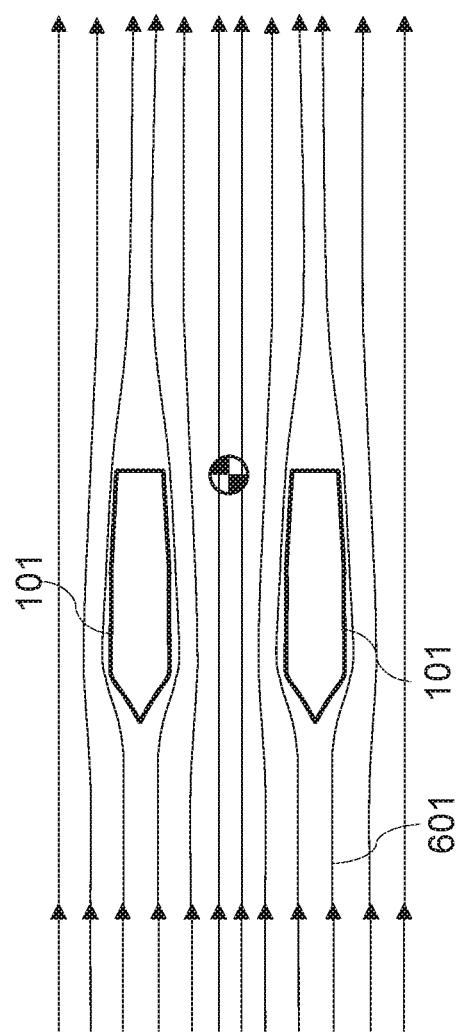
FIG. 8A is a cross-section view, of FIG. 8, illustrating the water flow while PLANING.

FIG. 8A is a cross-section view, of FIG. 8, illustrating the water flow while PLANING.

FIG. 8B is a side view of a multi-hull seaplane embodiment, shown in FIG. 8, illustrating the weight of the seaplane is counteracted by the wing lift and longitudinal stability is maintained by the horizontal stabilizer and hydrodynamic lift from the forward hulls. With no hulls located aft of the step, i.e. no afterbody, and all hulls laterally spaced, there is no area of concern for porpoising and impacts from the Roach.

Figure 9:
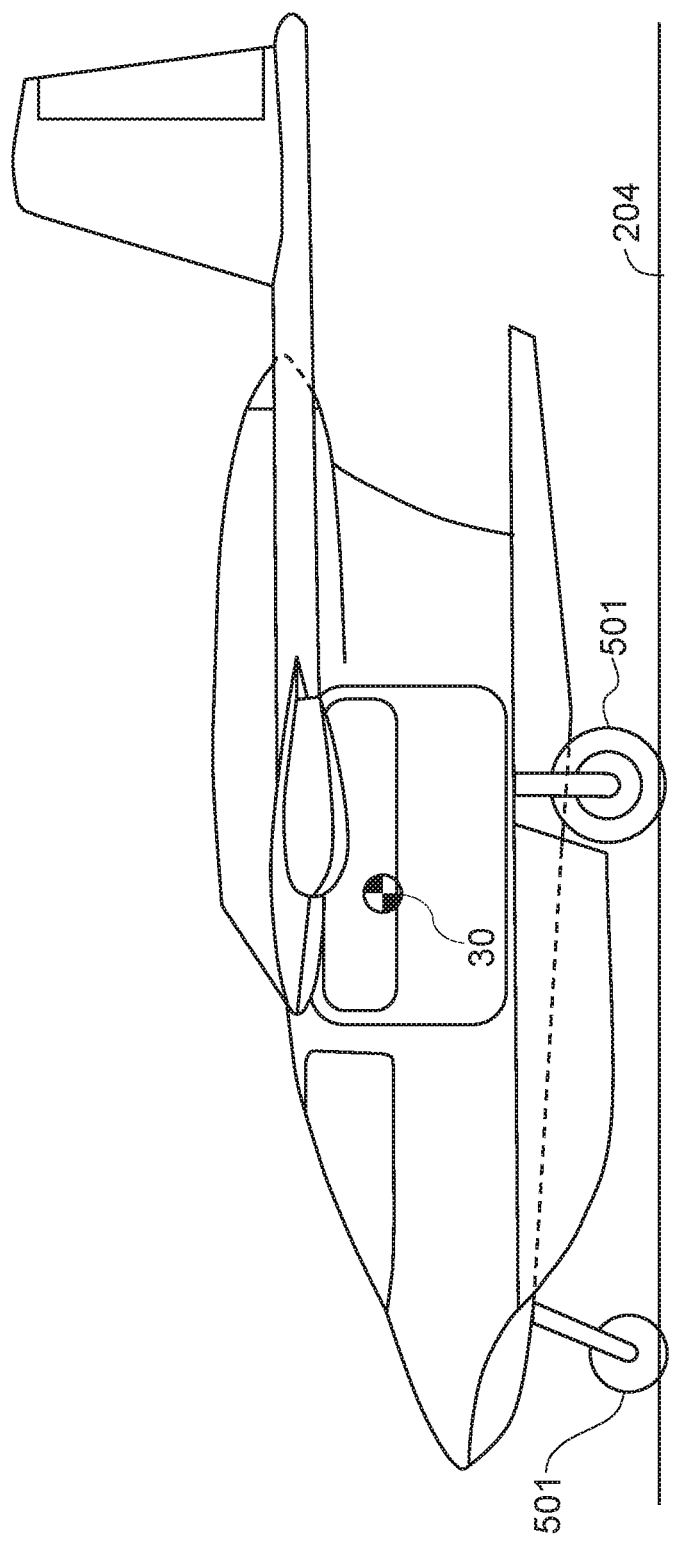
FIG. 9 is a side view of a multi-hull seaplane embodiment illustrating landing gear extended.

FIG. 9 is the seaplane embodiment that shows the forward hulls ending slightly aft of the center of gravity (CG) 30 allows incorporation of tricycle landing gear, the preferred arrangement of landing gear 501, allows retraction directly into the fuselage. This saves structural weight by not requiring the gear to be cantilevered and mounted into a sponson or float. The ground line 204 depicts the ground line when landing gear 501 is extended.

FIG. 10 is a seaplane (Float Plane) example that consists of an aircraft 11 with cantilevered floats 121 attached. The buoyancy of the cantilevered floats support the entire weight of the seaplane and it remains in an attitude similar to being at rest on the water.

The DISPLACEMENT waterline 200 depicts the waterline when at rest. The cantilevered floats provide lateral and longitudinal stability and buoyancy at rest.

The cantilevered floats are used for PLOWING. PLOWING—at low speeds up to planing, the forward motion creates a bow wave causing the seaplane to pitch up and climb the wave using the cantilevered floats.

In the PLANING position, most of the seaplane's weight is supported by hydrodynamic lift supplied by the cantilevered floats. The PLANING waterline 202 depicts the waterline when PLANING depicting the wing floats above the waterline.

For lateral stabilization on the water, to minimize aerodynamic drag in seaplanes while enabling buoyancy, devices such as wingtip floats, mid floats or sponsons can be added. Sponsons or wing mounted floats provide latitude control at lower speeds.

The floats provide longitudinal stability due to the having displacement volume forward and aft of the center of gravity.

Figure 10A:
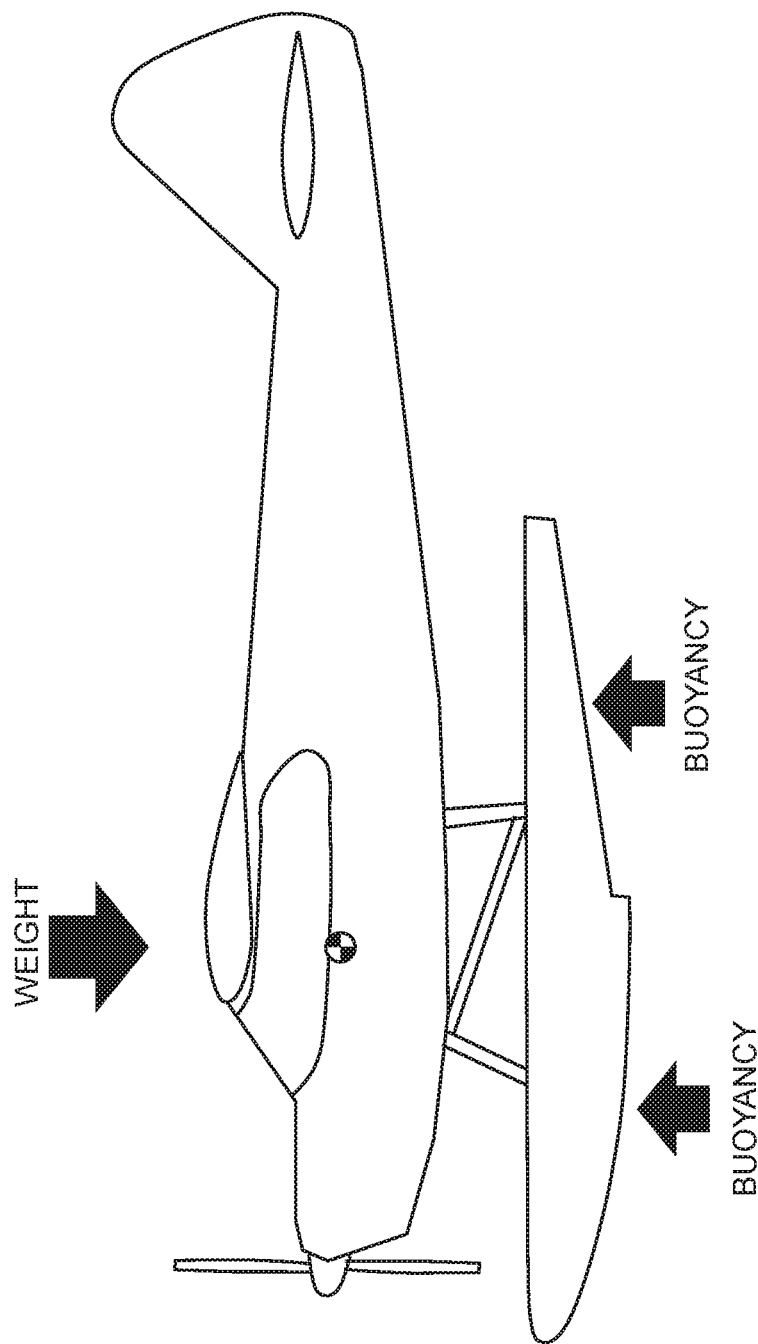
FIG. 10A is a side view of a seaplane (FLOAT PLANE) illustrating the weight of the seaplane is counteracted by the forward and aft hulls providing longitudinal and lateral stability in the DISPLACEMENT mode.

FIG. 10A is a side view of the seaplane (Float Plane) example, shown in FIG. 10, illustrating the weight of the seaplane is counteracted by the buoyancy of the forward and aft parts of the floats providing longitudinal and lateral stability in the DISPLACEMENT mode.

Figure 10B:
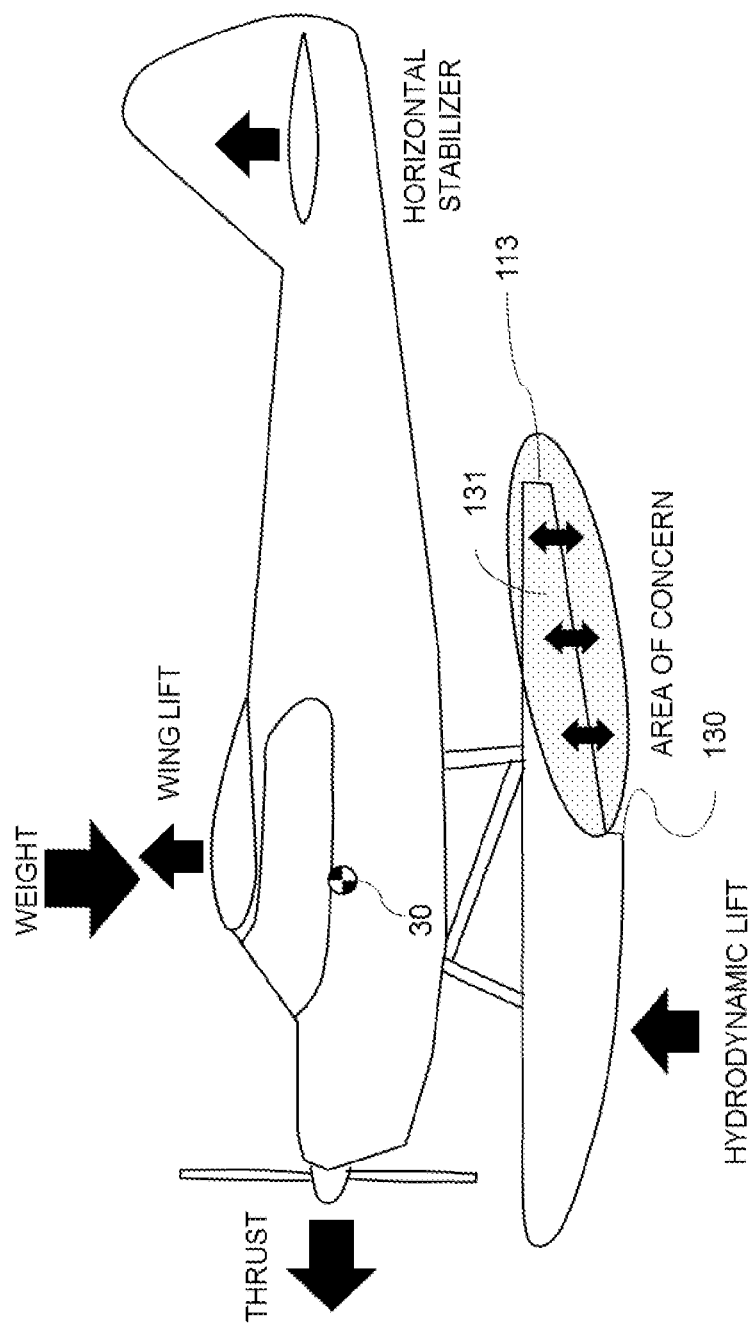
FIG. 10B is a side view of a seaplane (FLOAT PLANE) illustrating the dynamics of the forces in the PLANING mode.

FIG. 10B is a side view of the seaplane example, shown in FIG. 10, illustrating in the PLANING mode, the weight of the seaplane (Float Plane) is counteracted by the wing lift and hydrodynamic lift from the forward section of the floats, in front of the step.

Depicted is the longitudinal stability which is maintained by the horizontal stabilizer and hydrodynamic lift from the forward hull section, in front of the step. Depicted is the area of concern, the afterbody 131, the area aft of the main step and terminating at the sternpost 113, which can induce porpoising and may be impacted from the Roach.

FIG. 11 is front view of seaplane 12 (Flying Boat) example with a center hull 102 illustrating hull mounted sponsons 122 for lateral stability. The buoyancy of the center hull 103 and sponsons 102 support the entire weight of the seaplane 12 and it remains in an attitude similar to being at rest on the water. The DISPLACEMENT waterline 200 depicts the waterline when at rest.

The hull and sponsons are used for PLOWING. PLOWING—at low speeds up to planing, the forward motion creates a bow wave causing the seaplane to pitch up and climb the wave using the hull.

The PLANING waterline 202 depicts the waterline when PLANING. In the PLANING position, most of the seaplane's weight is supported by hydrodynamic lift supplied by hull rather than the buoyancy of the sponsons.

Figure 11A:
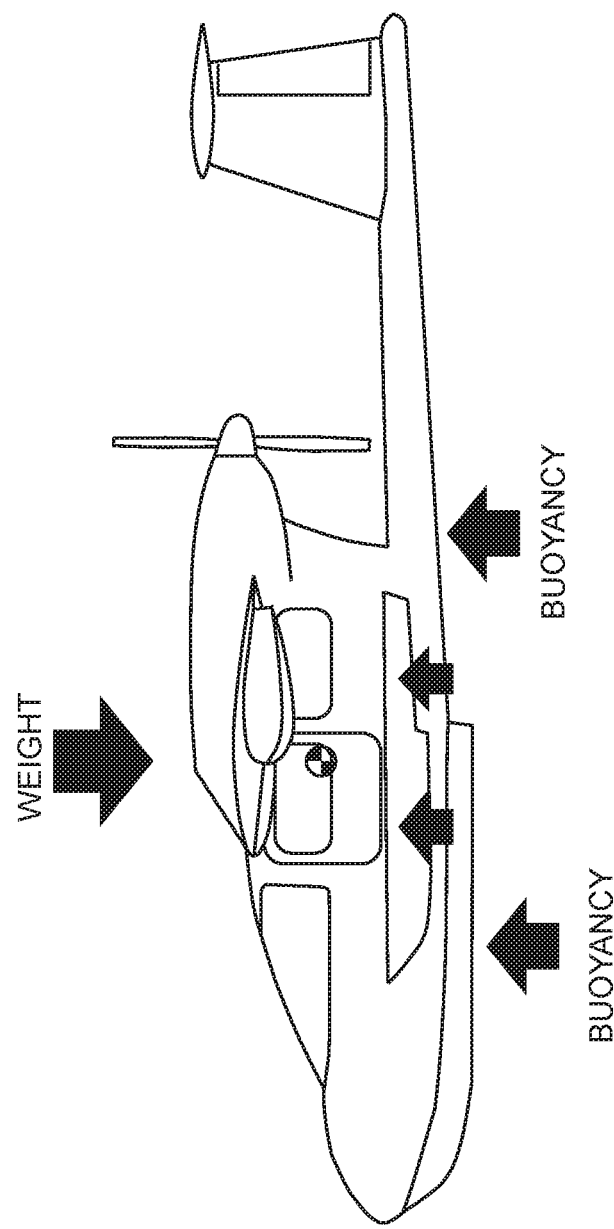
FIG. 11A is a seaplane with a center hull with hull mounted sponsons illustrating the weight of the seaplane is counteracted by the forward and aft hulls providing longitudinal and lateral stability in the DISPLACEMENT mode.

FIG. 11A is a side view of the seaplane (Flying Boat) example, shown in FIG. 11, illustrating the weight of the seaplane is counteracted by the buoyancy of the forward and aft sections of the hull and sponsons providing longitudinal and lateral stability in the DISPLACEMENT mode.

Figure 11B:
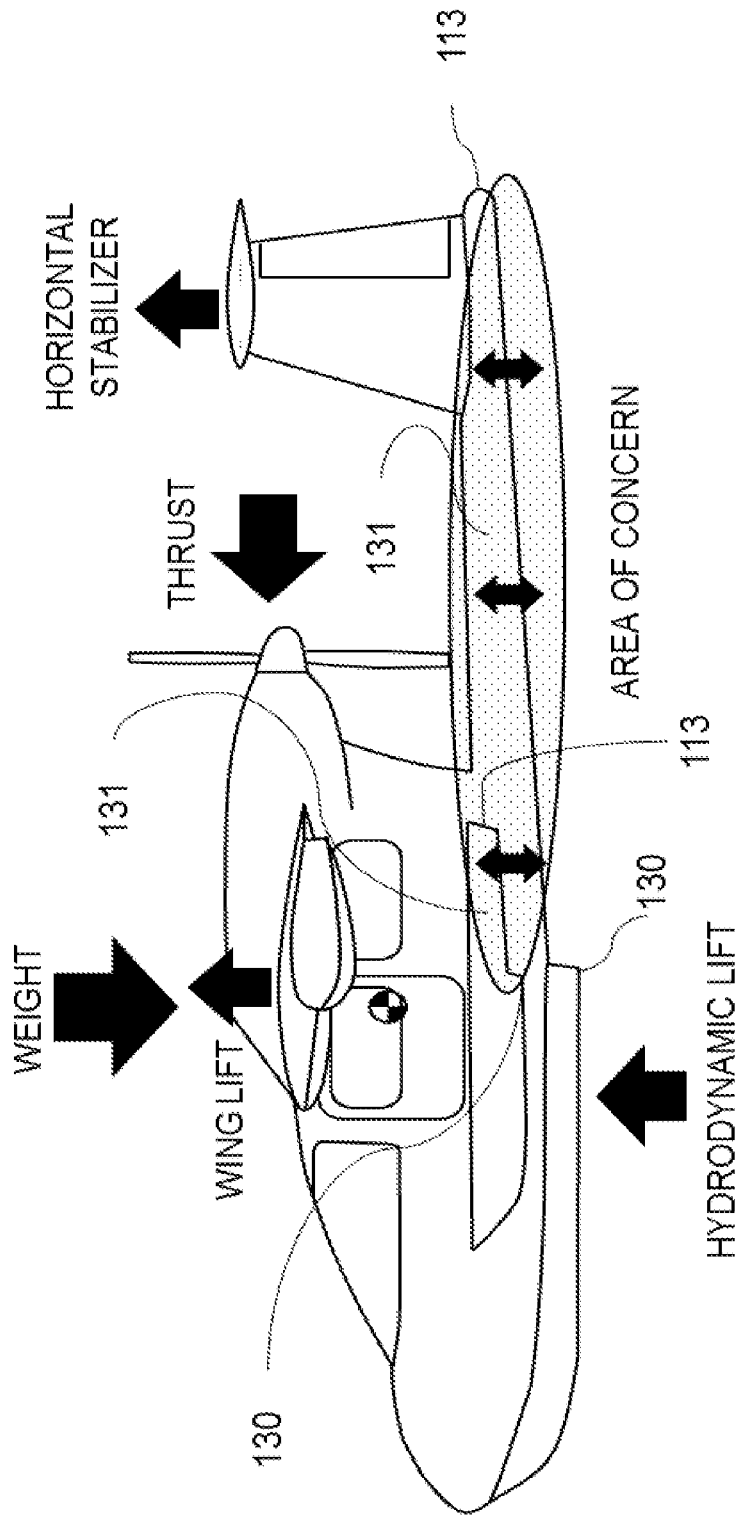
FIG. 11B is a seaplane with a center hull with hull mounted sponsons illustrating the dynamics of the forces in the PLANING mode and the area of concern that may preclude Roach impact and/or porpoising.

FIG. 11B is a side view of the seaplane (Flying Boat) example, shown in FIG. 11, illustrating in the PLANING mode, the weight of the seaplane is counteracted by the wing lift and hydrodynamic lift from the forward section of the hull, in front of the step.

Depicted is the longitudinal stability which is maintained by the horizontal stabilizer and hydrodynamic lift from the forward hull section, in front of the step. Depicted is the area of concern, the afterbodies 131, the area aft of the main steps 130 and terminating at the sternposts 113, which can induce porpoising and may be impacted from the Roach.

Figure 12:
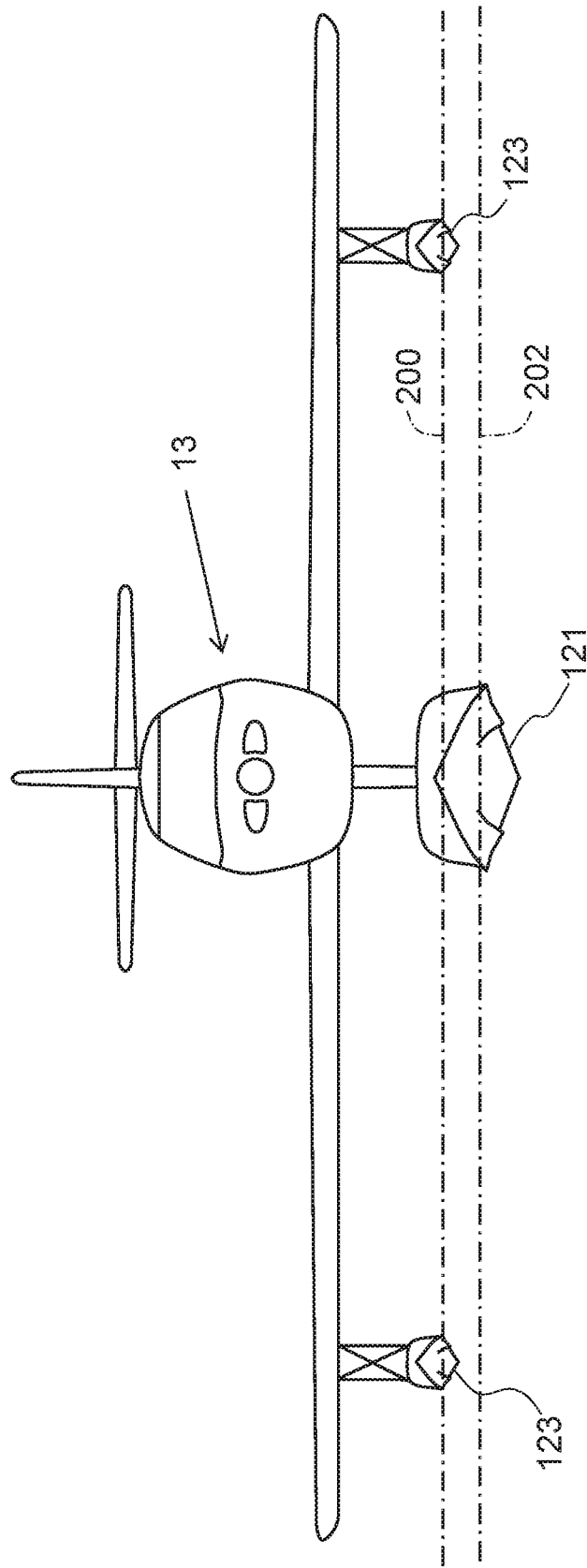
FIG. 12 is a seaplane with a single main float and wing floats.

FIG. 12 is a seaplane 13 example with a single main float 121 and wing floats 123. The buoyancy of the single main float and wing floats support the entire weight of the seaplane and it remains in an attitude similar to being at rest on the water.

The DISPLACEMENT waterline 200 depicts the waterline when at rest. The wing floats provide lateral stability and additional buoyancy at rest. The single main float provides longitudinal stability.

The center float 121 and wing floats 123 are used for PLOWING. PLOWING—at low speeds up to planing, the forward motion creates a bow wave causing the seaplane to pitch up and climb the wave using the single main float.

In the PLANING position, most of the seaplane's weight is supported by hydrodynamic lift supplied by the single main float, whereas the wing floats are completely out of the water. The PLANING waterline 202 depicts the waterline when PLANING depicting the wing floats above the waterline.

FIG. 13 is a twin hulled seaplane 14 example. The buoyancy of the twin hulls 102 support the entire weight of the seaplane and it remains in an attitude similar to being at rest on the water. The twin hulls provide lateral stability and additional buoyancy at rest.

The DISPLACEMENT waterline 200 depicts the waterline when at rest. The twin hulls provide longitudinal stability.

The twin hulls are used for plowing. PLOWING—at low speeds up to planing, the forward motion creates a bow wave causing the seaplane to pitch up and climb the wave using the twin hulls. The PLANING waterline 202 depicts the waterline when PLANING.

FIG. 13A is a side view of the seaplane (Twin Hull) example, shown in FIG. 13, illustrating the weight of the seaplane is counteracted by the forward and aft sections of the hulls providing longitudinal and lateral stability in the DISPLACEMENT mode.

Figure 13B:
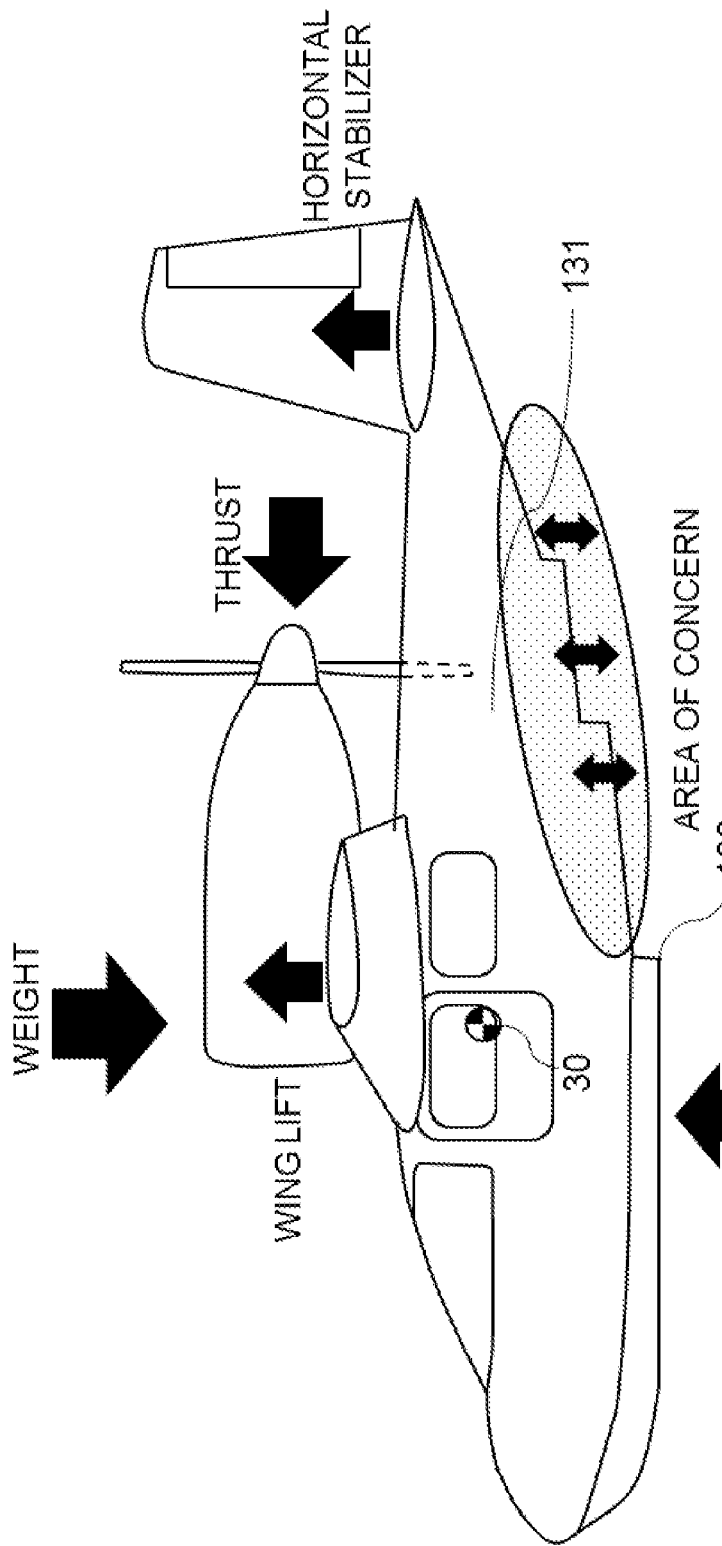
FIG. 13B is a twin hulled seaplane illustrating the dynamics of the forces in the PLANING mode and the area of concern that may preclude Roach impact and/or porpoising.

FIG. 13B is a side view of the seaplane (Twin Hull) example, shown in FIG. 13, illustrating in the PLANING mode, the weight of the seaplane is counteracted by the wing lift and hydrodynamic lift from the buoyancy of the forward section of the hull, in front of the step.

Depicted is the longitudinal stability which is maintained by the horizontal stabilizer and hydrodynamic lift from the forward hull section, in front of the step. Depicted is the area of concern, the afterbody 131, the area aft of the step 130, which can induce porpoising and may be impacted from the Roach.

Figure 14:
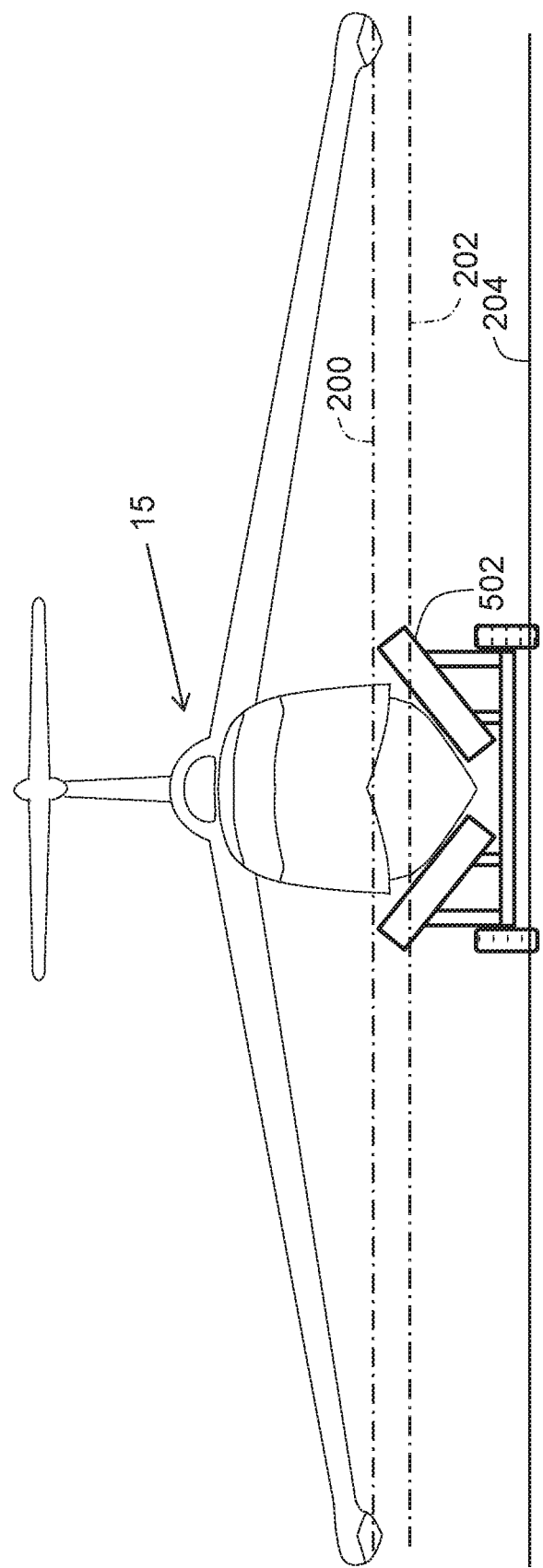
FIG. 14 is a seaplane on beaching gear.

FIG. 14 is a seaplane 15 example on beaching gear 502. The ground line 204 depicts the ground line when beaching gear 502 is used. Beaching gear is used for seaplanes that have no accommodations to be moved on land. Incorporating landing gear to seaplane 11 on floats, FIG. 10, requires the gear to be stowed in the floats, requiring that the landing gear arrangement be composed of four wheels; more complex to operate, maneuvering and land than conventional tricycle gear arrangement. FIG. 13, twin hull seaplane 14 would require the same type of gear footprint as a seaplane on floats. The older seaplane 13 on a single hull approach, FIG. 12 would require that the gear be stowed in the float adding more structural weight and complexity to the single float. The alternative would be not to include the gear and utilize a separate beaching gear structure, as shown in seaplane 15 in FIG. 14.

Figure 15A:
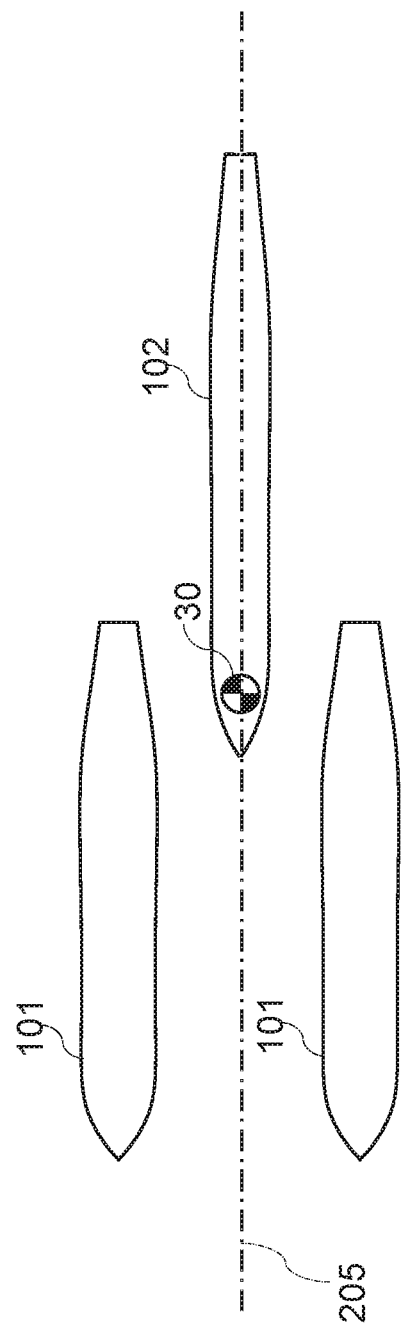
FIG. 15A is a three hull multi-hull arrangement with more hulls located forward than aft as per invention.
Figure 15B:
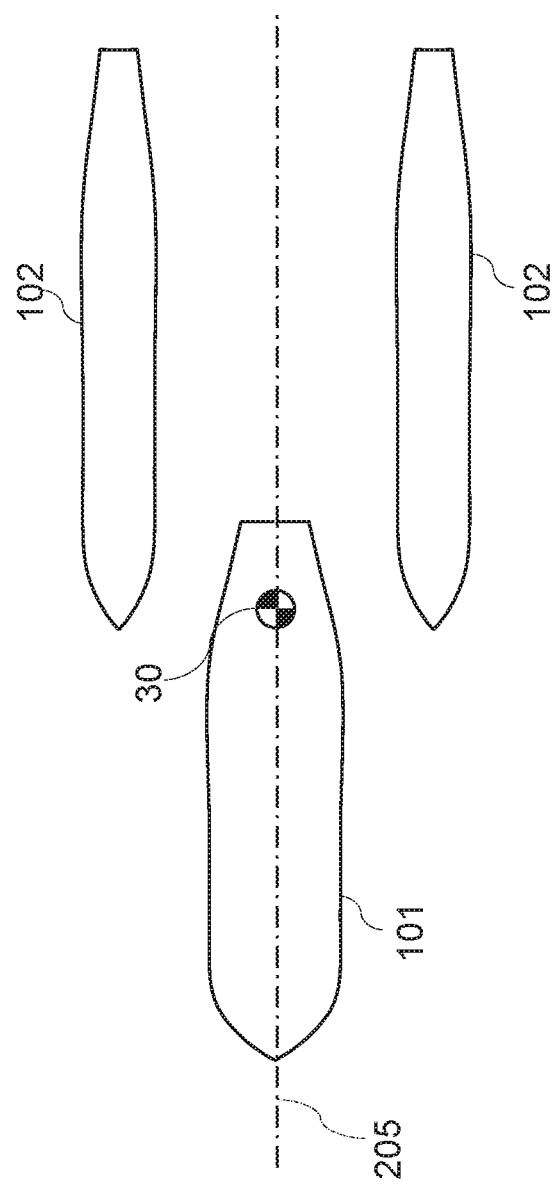
FIG. 15B is a three hull multi-hull arrangement with more hulls located aft than forward.
Figure 15D:
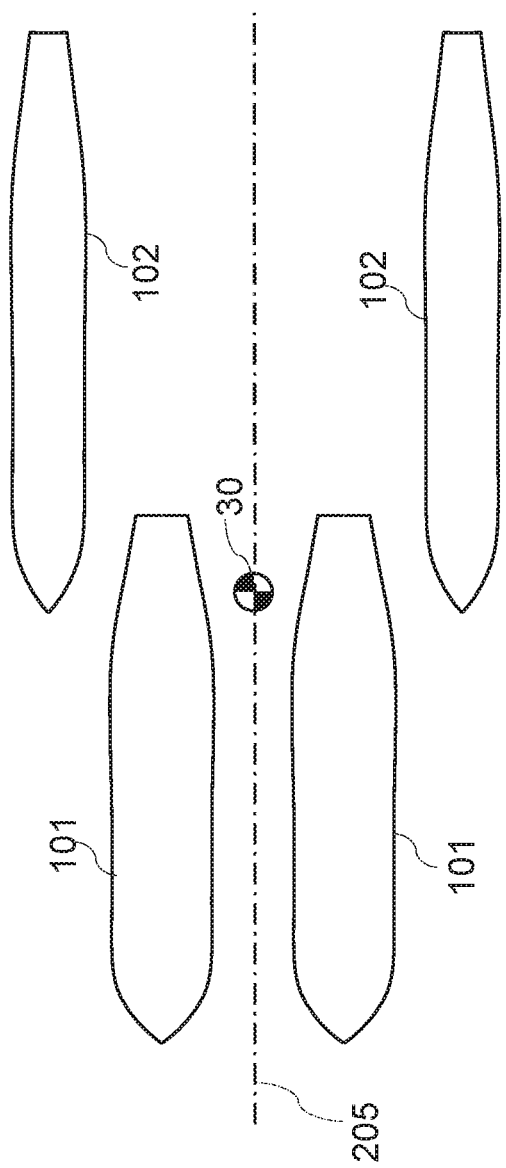
FIG. 15D is a four hull multi-hull arrangement with two aft hulls located outboard of the two forward hulls.
Figure 15E:
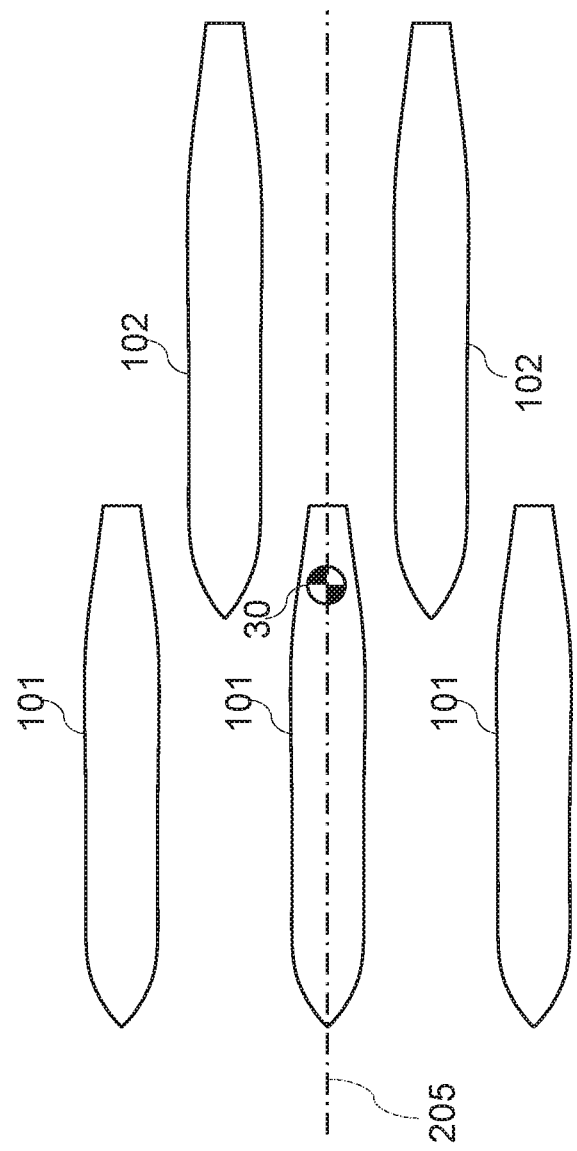
FIG. 15E is a five hull multi-hull arrangement with more hulls located forward than aft.

FIG. 15A is a three hull multi-hull arrangement, per this embodiment and preferred approach, with more hulls located forward than aft. Shown are the forward hulls 101, aft (center) hull 102 and the centerline 205.

FIG. 15B through FIG. 15F show bottom views of further hull arrangements that can be configured to accomplish the same results per the invention FIG. 15A to eliminate porpoising, wherein the front main hull(s) 101, symmetrical along the centerline 205, extending from the front of the multi-hull seaplane and end at or just aft of a center-of-gravity (CG) 30 location, which in turn locates the center of buoyancy ahead of the cg, and the aft stabilizing hull(s) 102 extending from the aft end of the multi-hull seaplane and ends aft, at or forward of a center-of-gravity (CG) location, so long as the center of buoyancy and planing area is behind the watercraft CG 30. Two or more hulls spaced laterally provide the lateral stability required for a seaplane.

All patents and publications mentioned in the prior art are indicative of the levels of those skilled in the art to which the invention pertains. All patents and publications are herein incorporated by reference to the same extent as if each individual publication was specifically and individually indicated to be incorporated by reference, to the extent that they do not conflict with this disclosure.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations, and broad equivalent arrangements.

We claim:

1. A multi-hull seaplane comprising:
a body housing a payload, the payload comprising at least one fuselage, at least one wing, and control surfaces;
a power plant which is coupled to the fuselage or wing; and
a combination of at least three hulls, wherein the combination provides a static and dynamic buoyancy, further
wherein each said hull provides one of a separate forward or a separate aft buoyancy and are directly attached to the fuselage, further
wherein the separate forward or the separate aft buoyancies are separately spaced, further
wherein at least one of said hulls which provides the separate forward buoyancy is a forward supporting surface and a hydroplaning surface that extends from a front of the seaplane and terminates just aft and adjacent of a center of gravity of the seaplane, further
wherein any said hull which provides the separate aft buoyancy is an aft supporting surface and at a lesser depth below a displacement waterline than each forward supporting surface, and further wherein no forward supporting surface is in-line longitudinally with any aft supporting surface.

2. The multi-hull seaplane of claim 1, wherein the forward supporting surface is a planing surface.

3. A method of utilizing the multi-hull seaplane of claim 1, the method comprising:
transitioning through a water displacement phase;
transitioning through water planing phase; and
becoming airborne.

4. A method of utilizing the multi-hull seaplane of claim 1, the method comprising:
decelerating to a landing speed;
contacting a liquid surface with the hull;
contacting the liquid surface with the front hulls; and
decelerating to a stop on the liquid surface.

5. The multi-hull seaplane of claim 1, wherein the body or hulls further comprises retractable landing gear which is configured to enable the seaplane to operate on land.

6. The multi-hull seaplane of claim 1, wherein with a sufficient velocity, the seaplane is configured to plane on the forward supporting surface or aft supporting surface.

7. The multi-hull seaplane of claim 1, wherein the seaplane is configured to eliminate a forebody-afterbody and step instability by prohibiting water flow off of a step from striking the afterbody.

8. The multi-hull seaplane of claim 1, wherein, the seaplane allows for a first attitude at rest and a second attitude in motion.

* * * * *